US008291591B2

(12) United States Patent
Miyajima et al.

(10) Patent No.: US 8,291,591 B2
(45) **Date of Patent: *Oct. 23, 2012**

(54) METHOD OF MANUFACTURING LIQUID CONTAINER AND LIQUID CONTAINER

(75) Inventors: Chiaki Miyajima, Matsumoto (JP); Masahide Matsuyama, Nagano-ken (JP); Yuichi Seki, Matsumoto (JP); Satoshi Shinada, Shiojiri (JP); Hisashi Koike, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1287 days.

This patent is subject to a terminal disclaimer.

(21) Appl. No.: 11/837,683

(22) Filed: Aug. 13, 2007

(65) Prior Publication Data

US 2008/0034712 A1 Feb. 14, 2008

(30) Foreign Application Priority Data

Aug. 11, 2006 (JP) ................................ P2006-220736

(51) Int. Cl.
*B65B 1/04* (2006.01)
*B23P 17/00* (2006.01)
*B41J 2/175* (2006.01)

(52) U.S. Cl. ................ 29/890.1; 141/2; 141/18; 347/86

(58) Field of Classification Search ................ 141/2, 18, 141/329, 346–349; 53/473; 347/85–86; 29/890.1

See application file for complete search history.

(56) References Cited

U.S. PATENT DOCUMENTS 5,598,198 A 1/1997 Taylor et al.
5,721,576 A * 2/1998 Barinaga ......................... 347/85
5,790,157 A * 8/1998 Higuma et al. ................. 347/85
(Continued)

FOREIGN PATENT DOCUMENTS

CN 1198729 C 4/2005
(Continued)

OTHER PUBLICATIONS

International Search Report dated Sep. 18, 2007, issued in related U.S. Appl. No. 11/837,715.

*Primary Examiner* — Gregory Huson
*Assistant Examiner* — Nicolas A Arnett
(74) *Attorney, Agent, or Firm* — Sughrue Mion, PLLC

(57) ABSTRACT

A method of manufacturing a liquid container, the liquid container including a liquid containing chamber in which a liquid can be contained, an air communicating passage allowing the liquid containing chamber to communicate with the air, a liquid supply port for supplying the liquid contained in the liquid container to an outside, a liquid flow passage allowing the liquid container and the liquid supply port to communicate with each other, a valve accommodating chamber disposed in the liquid flow passage, a differential pressure valve which is disposed in the valve accommodating chamber, which is normally urged to a closed state, and which is changed from the closed state to an opened state when a differential pressure of a side of the liquid supply port and a side of the liquid containing chamber is equal to or more than a predetermined value, and a film member forming a part of the valve accommodating chamber, the method includes: pressing a valve body of the differential pressure valve in a direction in which the differential pressure valve is opened; and injecting the liquid from the liquid supply port to the liquid containing chamber via the liquid flow passage while maintaining the opened state of the differential pressure valve.

8 Claims, 14 Drawing Sheets

U.S. PATENT DOCUMENTS

| | | | | |
|---|---|---|---|---|
| 5,819,627 | A | 10/1998 | Hayao | |
| 5,852,459 | A | 12/1998 | Pawlowski, Jr. et al. | |
| 5,900,895 | A | 5/1999 | Merrill | |
| 6,000,788 | A | 12/1999 | Iida | |
| 6,058,984 | A * | 5/2000 | Sato | 141/7 |
| 6,193,364 | B1 | 2/2001 | Iida | |
| 6,199,600 | B1 * | 3/2001 | Ahn et al. | 141/2 |
| 6,332,481 | B1 * | 12/2001 | Shinada et al. | 141/18 |
| 6,539,985 | B2 * | 4/2003 | Shinada et al. | 141/2 |
| 6,585,358 | B2 * | 7/2003 | Usui et al. | 347/85 |
| 6,619,344 | B2 * | 9/2003 | Schonfelder et al. | 141/330 |
| 6,729,360 | B2 * | 5/2004 | Sesek et al. | 141/2 |
| 6,854,835 | B2 * | 2/2005 | Kobayashi et al. | 347/85 |
| 6,905,199 | B2 | 6/2005 | Miyazawa et al. | |
| 6,920,903 | B2 * | 7/2005 | Ansier et al. | 141/2 |
| 6,973,943 | B2 * | 12/2005 | Sesek et al. | 141/18 |
| 7,165,835 | B2 * | 1/2007 | Ota et al. | 347/86 |
| 7,293,866 | B2 | 11/2007 | Miyazawa et al. | |
| 7,344,215 | B2 * | 3/2008 | Cutler et al. | 141/18 |
| 7,461,929 | B2 * | 12/2008 | Sasaki | 347/85 |
| 7,513,613 | B2 * | 4/2009 | Ishizawa et al. | 347/86 |
| 7,784,930 | B2 | 8/2010 | Miyazawa et al. | |
| 7,788,807 | B2 * | 9/2010 | Miyajima et al. | 347/85 |
| 7,815,298 | B2 | 10/2010 | Miyazawa et al. | |
| 7,942,510 | B2 * | 5/2011 | Shinada et al. | 347/86 |
| 2001/0050113 | A1 | 12/2001 | Shinada et al. | |
| 2001/0052370 | A1 | 12/2001 | Shinada et al. | |
| 2002/0180849 | A1 * | 12/2002 | Sakai et al. | 347/86 |
| 2004/0239736 | A1 | 12/2004 | Miyazawa et al. | |
| 2005/0285914 | A1 | 12/2005 | Sasaki | |
| 2006/0290758 | A1 * | 12/2006 | Busch et al. | 347/86 |

FOREIGN PATENT DOCUMENTS

| | | | |
|---|---|---|---|
| EP | 1125747 | A3 | 11/2002 |
| EP | 1270235 | A1 | 1/2003 |
| EP | 1609603 | A1 | 12/2005 |
| GB | 2288148 | A | 10/1995 |
| GB | 2392875 | A | 3/2004 |
| JP | 2003-080732 | | 3/2003 |
| JP | 2003-094682 | A | 4/2003 |
| JP | 2003-305863 | | 10/2003 |
| JP | 2005-081781 | | 3/2005 |
| JP | 2005-199516 | | 7/2005 |
| JP | 2006-007453 | | 1/2006 |
| JP | 2006175856 | A | 7/2006 |
| WO | 9730849 | A1 | 8/1997 |
| WO | 9822290 | A1 | 5/1998 |
| WO | WO 00/58100 | | 10/2000 |

* cited by examiner

METHOD OF MANUFACTURING LIQUID CONTAINER AND LIQUID CONTAINER

BACKGROUND

1. Technical Field

The present invention relates to a method of manufacturing a liquid container in which a liquid containing chamber contains a liquid such as ink and a liquid container manufactured by the method.

2. Related Art

As such a kind of a liquid container, an ink cartridge mounted on a liquid jetting apparatus such as, for example, an ink jet printer is suggested (for example, see Patent Document 1). In general, the ink cartridge includes a container body having a substantially flat boxlike shape which is detachable from a cartridge holder included in the liquid jetting apparatus, and films which are attached to both the front and back surfaces of the container body.

The container body is provided with an ink supply port, which is connected to an ink receiver, such as an ink supply needle provided in the cartridge holder when the container body is mounted on the cartridge holder of the liquid jetting apparatus. In the inside of the container body, an ink containing chamber for containing ink, an air communicating passage for allowing the inside of the ink containing chamber to communicate with the air, and an ink flow passage for allowing the ink containing chamber and the ink supply port to communicate with each other are partitioned so that a plurality of partition walls and the films form wall surfaces. Further, a differential pressure valve, which is interposed in the way of the ink flow passage, is normally urged to a closed state while changed to an opened state when a differential pressure between a side of the ink supply port and a side of the ink containing chamber is equal to or more than a predetermined value For this reason, when the ink cartridge is mounted on the cartridge holder of the liquid jetting apparatus and when the differential pressure between the side of the ink supply port and the side of the ink containing chamber is equal to or more than a predetermined value according to ink consumption of the liquid jetting apparatus, the differential pressure valve becomes the opened state. Accordingly, the ink contained in the ink containing chamber is supplied to the ink supply port via the ink flow passage so as to be consumed by the liquid jetting apparatus. Alternatively, when the ink cartridge is not mounted on the cartridge holder of the liquid jetting apparatus or the differential pressure of the side of the ink supply port and the side of the ink containing chamber is less than the predetermined value while the ink cartridge is mounted on the cartridge holder of the liquid jetting apparatus, the differential pressure valve is maintained to be in the closed state. As a result, the ink flow from the ink containing chamber to the ink supply port is blocked so that the unnecessary ink does not leak from the ink supply port.

Patent Document 1: JP-A-2003-94682

However, when the residual ink in the ink containing chamber decreases to a very small amount or zero and thus the ink supply is not satisfied, the ink cartridge that is used up is recovered, and then an individual configuration member thereof in which a method of disposing waste matters is different is usually classified to fall into dispose. For example, a film is removed from the container body. For this reason, in the known ink cartridge, when the residual ink decreases to the extent that the ink supply is poor, the used ink cartridge may be disposed. As a result, a wasteful use of the resource may happen.

Further, in the process of manufacturing the known ink cartridge, an ink injecting-only hole for injecting ink into an ink containing chamber is generally formed in the container body so as to inject the ink from the ink injecting-only hole to the ink containing chamber. However, in such a manufacturing method, it may be necessary to seal the ink injecting-only hole used to inject the ink, by attaching a sealing film after the ink is injected. Accordingly, the process of manufacturing the ink cartridge may be complicated and the number of the components may increase.

For this reason, when the ink cartridge that includes the ink containing chamber containing the ink is manufactured, there is recently a demand for a method of manufacturing the ink cartridge in which the ink can be easily and efficiently injected into the liquid containing chamber without using the ink injecting-only hole and the resources can be effectively used.

SUMMARY

An advantage of some aspects of the invention is to provide a method of manufacturing a liquid container in which liquid can be easily and efficiently injected to the liquid containing chamber and the resources can be effectively used for the liquid container in which the residual liquid decreases to the extent that the ink supply is poor, when the liquid container that includes the liquid containing chamber containing the liquid is manufactured, and a liquid container manufactured by the method. The advantage can be attained by at least one of the following aspects:

A first aspect of the invention provides a method of manufacturing a liquid container, the liquid container comprising a liquid containing chamber in which a liquid can be contained, an air communicating passage allowing the liquid containing chamber to communicate with the air, a liquid supply port for supplying the liquid contained in the liquid container to an outside, a liquid flow passage allowing the liquid container and the liquid supply port to communicate with each other, a valve accommodating chamber disposed in the liquid flow passage, and a differential pressure valve which is disposed in the valve accommodating chamber, which is normally urged to a closed state, and which is changed from the closed state to an opened state when a differential pressure of a side of the liquid supply port and a side of the liquid containing chamber is equal to or more than a predetermined value, the method comprising: opening the differential pressure valve; and injecting the liquid from the liquid supply port to the liquid containing chamber.

A second aspect of the invention provides a method of manufacturing a liquid container, the liquid container comprising a liquid containing chamber in which a liquid can be contained, an air communicating passage allowing the liquid containing chamber to communicate with the air, a liquid supply port for supplying the liquid contained in the liquid container to an outside, a liquid flow passage allowing the liquid container and the liquid supply port to communicate with each other, a valve accommodating chamber disposed in the liquid flow passage, a differential pressure valve which is disposed in the valve accommodating chamber, which is normally urged to a closed state, and which is changed from the closed state to an opened state when a differential pressure of a side of the liquid supply port and a side of the liquid containing chamber is equal to or more than a predetermined value, and a film member forming a part of the valve accommodating chamber, the method comprising: pressing a valve body of the differential pressure valve in a direction in which the differential pressure valve is opened; and injecting the liquid from the liquid supply port to the liquid containing chamber via the liquid flow passage while maintaining the opened state of the differential pressure valve.

According to the methods of manufacturing the liquid container, when the liquid is injected into the liquid containing chamber, the liquid supply port originally used for supplying the liquid to the liquid jetting apparatus can be also used for injecting the liquid to the liquid containing chamber without using an ink injecting-only hole. Further, when the residual ink decreases to the extent that the ink supply is poor, the liquid container can be reused by injecting the liquid from the liquid supply port to the liquid containing chamber. As a result, it is unnecessary to recover/dispose the used liquid container. Accordingly, when the liquid container that includes the liquid containing chamber containing the liquid is manufactured, the liquid can be easily and effectively injected to the liquid containing chamber and the resources can be effectively reused as much as possible in the liquid container in which the residual liquid decreases to the extent that the liquid supply is poor.

In the method of manufacturing the liquid container, the differential pressure valve is forcibly opened by piercing the film member with a jig from the outside to an inside of the liquid container such that the jig penetrates the film member and forming a gap between the valve body of the differential pressure valve and a valve seat on which the valve body is seated.

According to the method of manufacturing the liquid container, the differential pressure valve can be forcibly changed to the opened state just by preparing the jig that can penetrating the film member from the outside, piercing with the jig to penetrate the film member attached to one surface of the container body from the outside and bringing a leading end of the jig into contact with the differential pressure valve so as to define a gap between a valve body of the differential pressure valve and a valve seat on which the valve body is seated. Moreover, after the liquid is injected from the liquid supply port, the differential pressure valve can return to the closed state again just by taking out the jig that is inserted into the inside of the container to penetrate the film member. Accordingly, an increase in an equipment cost for allowing the differential pressure valve to be forcibly changed to the opened state can be suppressed.

In the method of manufacturing the liquid container, the jig has a needle-like portion capable of penetrating the film member and is inserted into the liquid container so that a leading end of the needle-like portion passes through a valve hole closed by the valve body in the closed state and presses the valve body so as to be changed to the opened According to the method of manufacturing the liquid container, since the jig has the needle-like portion, it is easy for the needle-like portion thereof to penetrating the film member. When the needle-like portion thereof is inserted into the container body so as to penetrate the film member in a position corresponding to the valve hole, the leading end of the needle-like portion passes through the inside of the valve hole closed by the valve body of the differential pressure valve in the closed state so as to press such that the valve body is changed to the opened state. As a result, the differential pressure valve can be forcibly changed to the opened state easily and effectively.

The method of manufacturing the liquid container further may include depressurizing the inside of the liquid containing chamber before injecting the liquid.

According to the method of manufacturing the liquid container, since the inside of the liquid containing chamber is depressurized in the depressurization process, the liquid can be effectively injected into the ink containing chamber in the subsequent ink injecting process.

In the method of manufacturing the liquid container, the inside of the liquid containing chamber may be depressurized through the air communicating passage in the depressurization process.

According to the method of manufacturing the liquid container, when the inside of the liquid containing chamber is depressurized and even when the depressurization-only passage is not provided in the container body, the air communicating passage can be also used as the depressurization hole. As a result, a rigidity can be satisfactorily guaranteed without configuring the complex container body.

In the method of manufacturing the liquid container, the method may further comprise taking out the jig after injecting the liquid, and sealing a through hole of the film member formed by the jig.

According to the method, the liquid container in which the residual liquid decreases to the extent that the liquid supply is poor can be reused.

In the method of manufacturing the liquid container, the through hole may be sealed by a film or a tape.

According to the method, the through hole of the film member formed by the jig can be easily sealed.

In the method of manufacturing the liquid container, the method may further comprise detaching a cover member covering the film member from the liquid container before pressing the valve body of the differential pressure valve.

According to the method, since the cover member is detached from the liquid container before piercing the jig, the insertion of the jig can be easily performed.

In the method of manufacturing the liquid container, the method may further comprise removing at least a part of a valve mechanism provided in the liquid supply port before injecting the liquid.

According to the method, the injection of the liquid can be facilitated.

In the method of manufacturing the liquid container, the method may comprise removing a part of a sealing film attached to the liquid supply port before the at least a part of the valve mechanism is removed.

According to the method, the removal of the valve mechanism can be facilitated.

In the method of manufacturing the liquid container, the method may comprise sealing the liquid supply port with a sealing film after injecting the liquid.

According to the method, the leakage of the liquid injected into the liquid container through the liquid supply port can be prevented.

A third aspect of the invention provides a liquid container manufactured by the method.

BRIEF DESCRIPTION OF THE DRAWINGS

The invention will be described with reference to the accompanying drawings, wherein like numbers reference like elements.

DESCRIPTION OF EXEMPLARY EMBODIMENTS (First Exemplary Embodiment)

Hereinafter, a first exemplary embodiment of the invention embodying an ink cartridge mounted on an ink jet printer (abbreviated to a "printer"), which is a kind of a liquid jetting apparatus, will be described in detail with reference to the accompanying FIGS. 1 to 9. Moreover, in the following description of exemplary embodiments, "a front and rear direction, "a right and left direction", and "an upward and downward direction denote the front and rear direction, the right and left direction, and the upward and downward direction, respectively indicated by arrows shown in FIGS. 1 to 4.

As shown in FIGS. 1 to 4, an ink cartridge (liquid container) 11 according to this exemplary embodiment includes a container body 12 of which the front surface (one surface) made of a synthetic resin such as, for example, polypropylene (PP) or the like is opened and which has a substantially flat rectangular shape. In the front surface of the container body 12, a front film (film member) 13 made of a material to be heat welded is attached to substantially cover the whole surface of an opening 12*a*, and a cover 14 is detachably attached so as to hide the opening 12*a* from the outside (front surface) of the front film 13. Further, in the rear surface and upper surface of the container body 12, a rear film 15 made of a material to be heat welded is attached so as to substantially cover the whole rear surface and the upper surface thereof.

Figure 1:
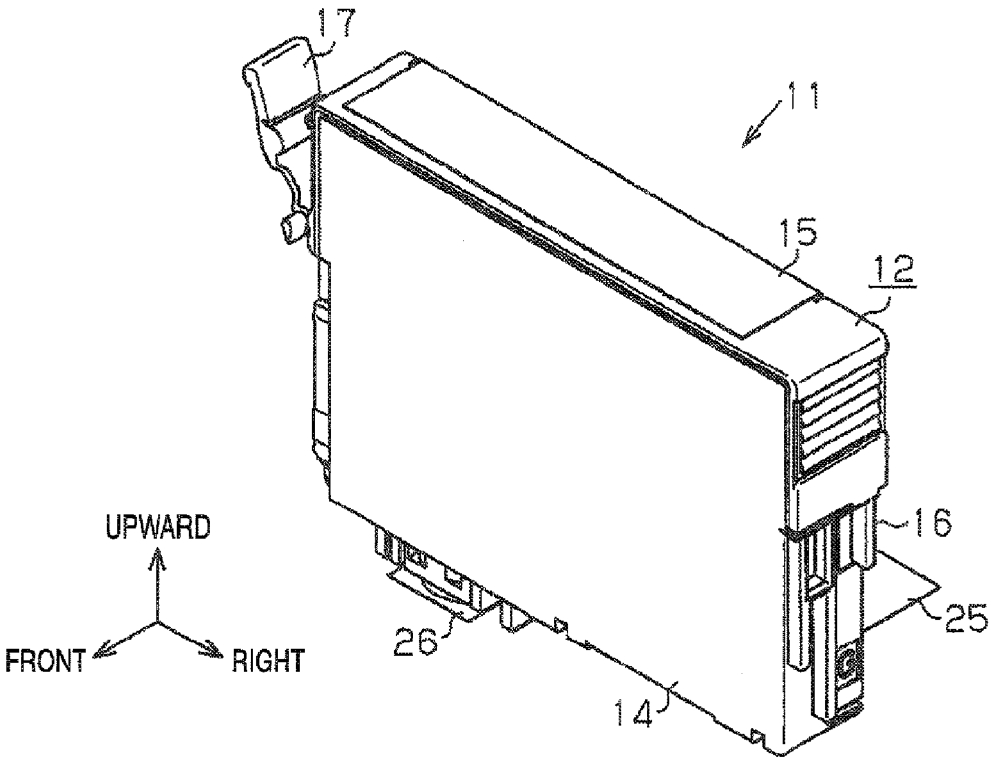
FIG. 1 is a perspective view illustrating the front surface of an ink cartridge according to a first exemplary embodiment.
Figure 3:
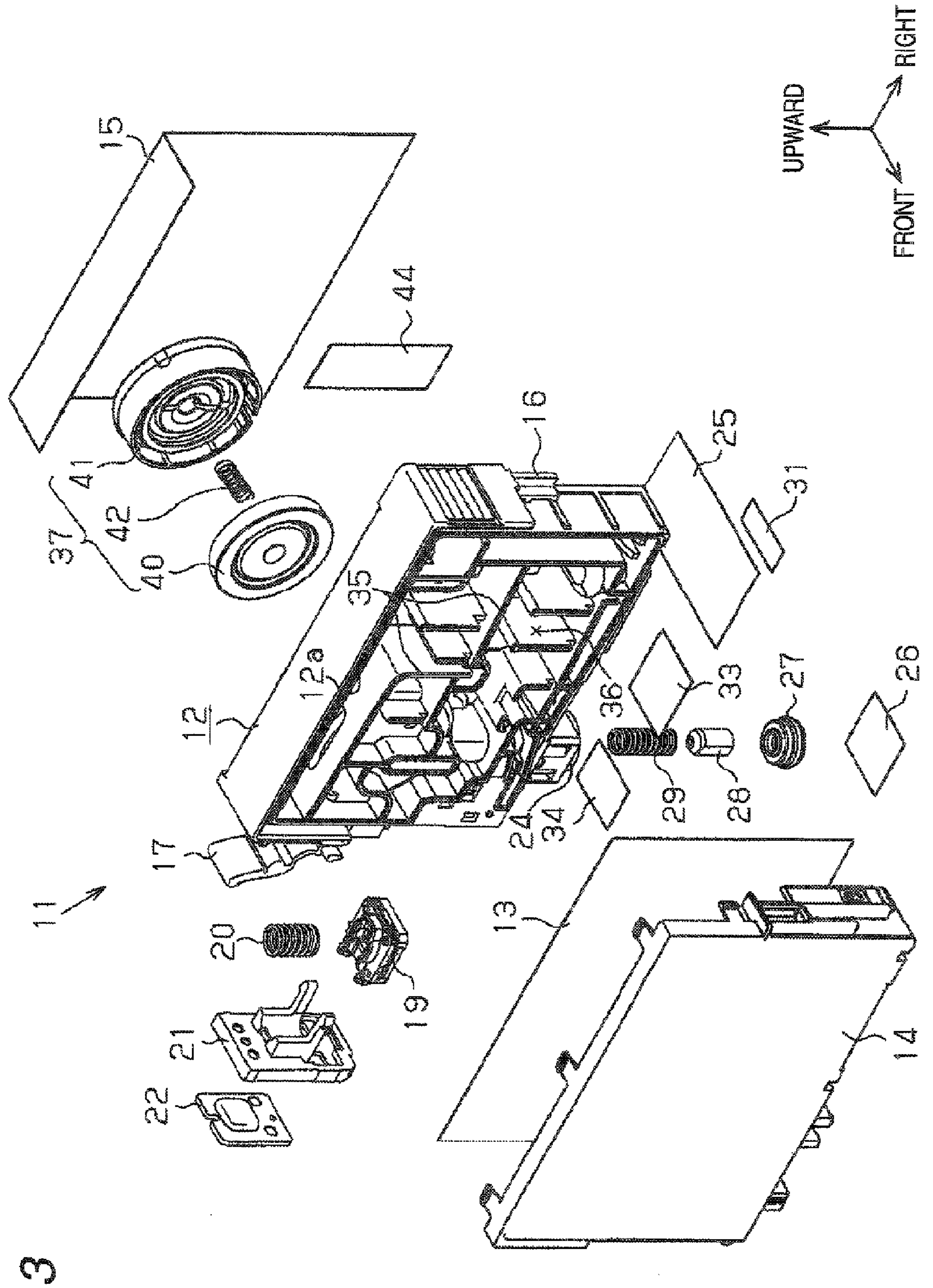
FIG. 3 is an exploded perspective view illustrating the front surface of the ink cartridge according to the same exemplary embodiment.

As shown in FIGS. 1 and 3, in the right surface of the container body 12, an erroneous mount preventing protrusion 16 for preventing the ink cartridge 11 from being erroneously mounted on a cartridge holder (not shown) provided in the printer is extended in the upward and downward direction. The erroneous mount preventing protrusion 16 is formed of each different shape according to a kind of ink color and an erroneous mount preventing concave (not shown) having a different shape according to the kind of the ink color is provided in the cartridge of the printer so as to individually correspond to the erroneous mount preventing protrusion 16 of each ink color. That is, even when the plurality of cartridges having different colors are mounted on the cartridge holders of the printer, the ink cartridge 11 cannot be mounted on inappropriate places except a place where the erroneous mount preventing concave only fitted with the erroneous mount preventing protrusion 16 in the ink cartridge 11 is formed.

Figure 4:
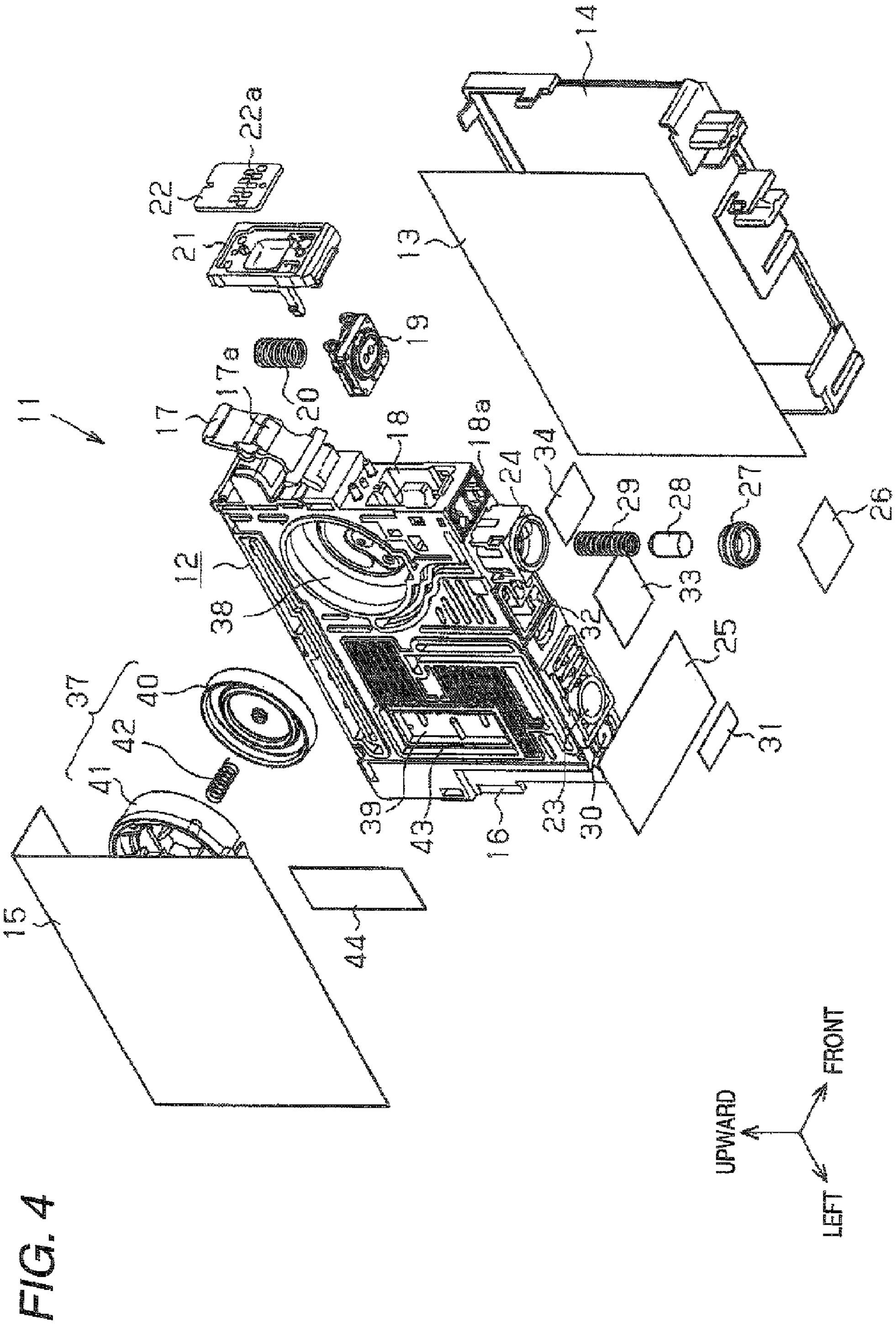
FIG. 4 is an exploded perspective view illustrating the rear surface of the ink cartridge according to the same exemplary embodiment.

Meanwhile, as shown in FIGS. 1 to 4, an engagement lever 17 formed so as to be elastically deformed is extended obliquitously upward in the right side from the upper portion of the left surface of the container body 12. In the substantial center of the right surface which is a surface of the engagement lever 17, a locking piece 17*a* is protruded so as to come in a horizontal direction. Accordingly, when the ink cartridge 11 is mounted on the cartridge holder of the printer, the engagement lever 17 is elastically deformed and the locking piece 17*a* is locked in a part of the cartridge holder so that the ink cartridge 11 is locked to the cartridge holder As shown in FIG. 4, in the left surface of the container body 12, a sensor accommodating chamber 18 is concavely formed below the engagement lever 17. A sensor unit 19 including a sensing mechanism (not shown) that generates vibration and outputs the residual vibration to the printer such that the printer can detect whether ink is present or not when the ink cartridge 11 is mounted on the cartridge holder of the printer and a coil spring 20 that presses the sensor unit 19 against the inner wall of the sensor accommodating chamber 18 are accommodated in the sensor accommodating chamber 18. Further, an opening of the right surface of the sensor accommodating chamber 18 is blocked by a cover member 21.

A circuit board 22 including a semiconductor storage element is provided on the surface of the cover member 21 and various kinds of information (for example, ink color information, residual ink information, and so on) on the ink cartridge 11 is stored in the semiconductor storage element. Moreover, when the ink cartridge 11 is mounted on the cartridge holder of the printer, a terminal 22*a* that is exposed to the surface is connected to a connecting terminal of the cartridge holder so that the circuit board 22 can send and receive the various kinds of the information to and from a control device (not shown) of the printer.

As shown in FIG. 4, an air introducing hole 23 for introducing air from atmosphere to the inside of the container body 12 and an ink supply port (liquid supply port) 24 into which an ink supply needle (not shown) provided in the cartridge holder is inserted when the ink cartridge 11 is mounted on the cartridge holder of the printer are opened in the lower surface of the container body 12. That is, the ink cartridge 11 is an ink cartridge of an open type that supplies ink (liquid) from the ink supply port 24 to the printer (that is, the container body 12 and so on) while introducing air from the air introducing hole 23 to the inside of the container body 12.

Figure 2:
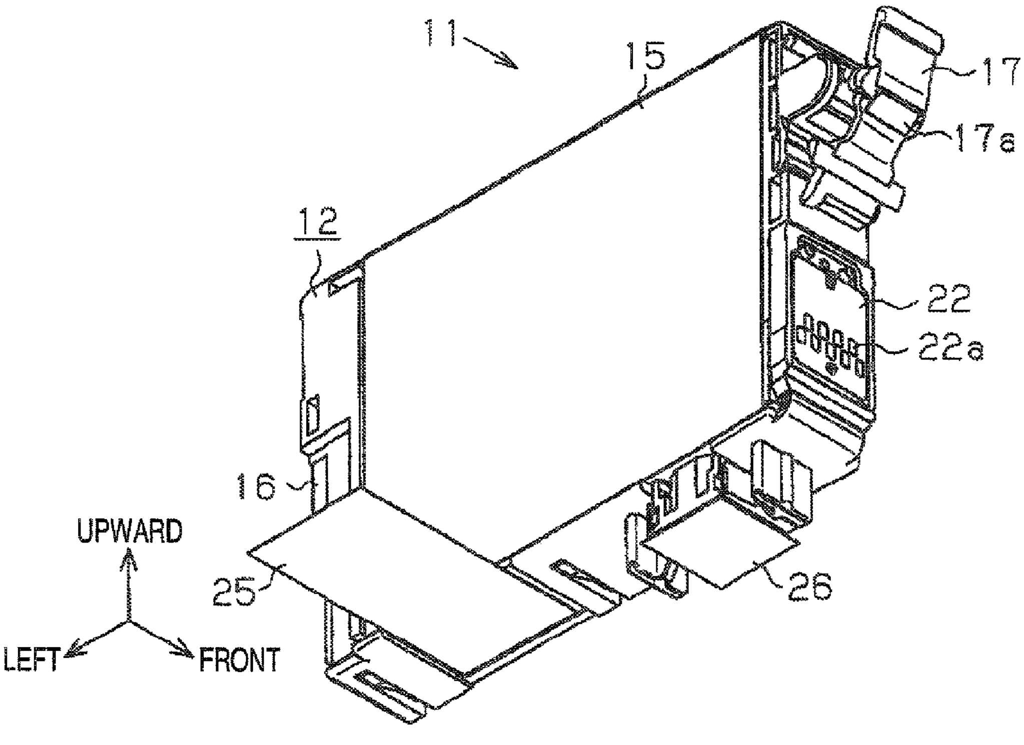
FIG. 2 is a perspective view illustrating the rear surface of the ink cartridge according to the same exemplary embodiment.

As shown in FIGS. 2 and 4, the air introducing hole 23 is sealed by a sealing film 25. Before the ink cartridge 11 is mounted on the cartridge holder of the printer to be used, the sealing film 25 is removed by a user. When the sealing film 25 is removed and then the air introducing hole 23 is exposed to the outside, the inside of the container body 12 of the ink cartridge 11 can be allowed to communicate with the air. Similarly, the ink supply port 24 is sealed by a sealing film 26. When the ink cartridge 11 is mounted on the cartridge holder of the printer, the sealing film 26 is pierced by the ink supply needle provided in the cartridge holder.

As shown in FIGS. 3 and 4, in the inside of the ink supply port 24, a valve mechanism V constituted by a ring-shaped sealing member 27 having a through hole in the middle and made of elastomer and so on, which allows the ink supply needle of the cartridge holder to be inserted into the ink supply port 24, a supply valve 28 seated on the sealing member 27, and a coil spring 29 urging the supply valve 28 toward the sealing member 27 is accommodated. That is, the supply valve 28 urged by the coil spring 29 is brought in press-contact with the sealing member 27, and thus the ink supply port 24 is normally blocked so that the ink cannot drain to the container body 12 and so on. Alternatively, when the ink supply needle of the cartridge holder is inserted into the ink supply port 24, the supply valve 28 pressed by the ink supply needle resists against the urging force of the coil spring 29*r* moves the inside of the ink supply port 24 to be separated from the sealing member 27. Accordingly, the ink supply port 24 becomes the opened state so that the ink can be allowed to drain to the container body 12 and so on. Meanwhile, since the coil spring 29 is an example of an elastic member, the elastic member of the invention is not limited thereto as long as it urges the supply valve 28 toward the sealing member 27. In addition, a valve mechanism of the invention is not limited to the valve mechanism of this exemplary embodiment and thus known valve mechanisms, for example a valve mechanism that does not have a through hole and allows the ink supply needle of the cartridge holder to be inserted and penetrated therethrough so as to drain the ink, can be used.

Similarly, in the lower surface of the container body 12, a depressurization hole 30 for depressurizing the inside of the container body 12 by sucking air from the inside thereof before the process of injecting the ink into the ink cartridge 11 is opened in the left side of the air introducing hole 23. Further, the depressurization hole 30 is sealed by a sealing film 31. Between the air introducing hole 23 and the ink supply port 24, a concave portion 32 that constitutes a part of an ink flow passage (liquid flow passage) from an ink containing chamber 36 to the ink supply port 24 is formed. Similarly, the concave portion 32 is sealed by a sealing film 33. Further, a lower surface opening 18*a* of the sensor accommodating chamber 18 is formed in the right side of the ink supply port 24. The opening 18*a* is also sealed by a sealing film 34.

Next, an inner structure of the container body 12 of the ink cartridge 11 will be described.

Figure 5:
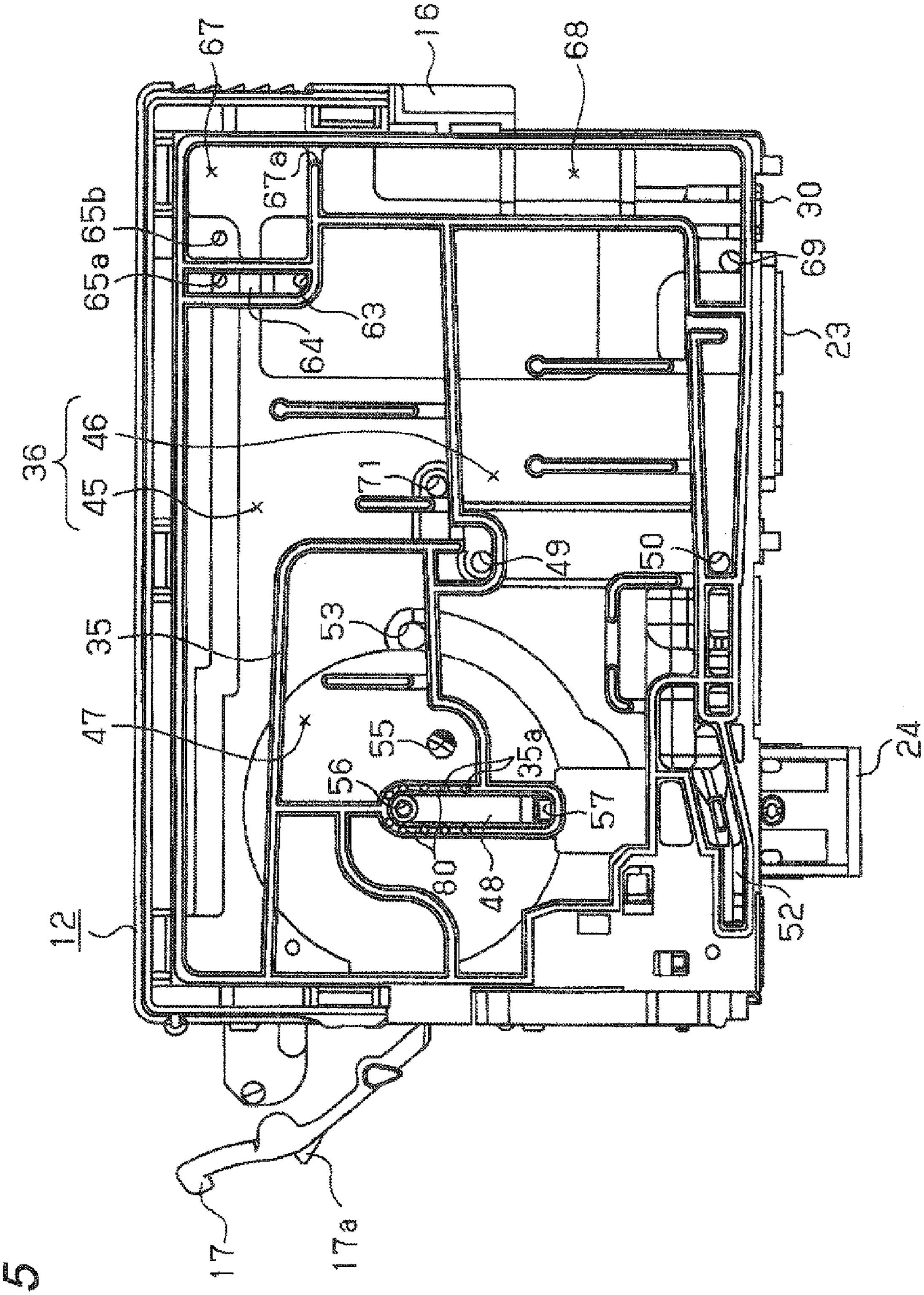
FIG. 5 is a front (fore) view illustrating the ink cartridge according to the same exemplary embodiment.
Figure 6:
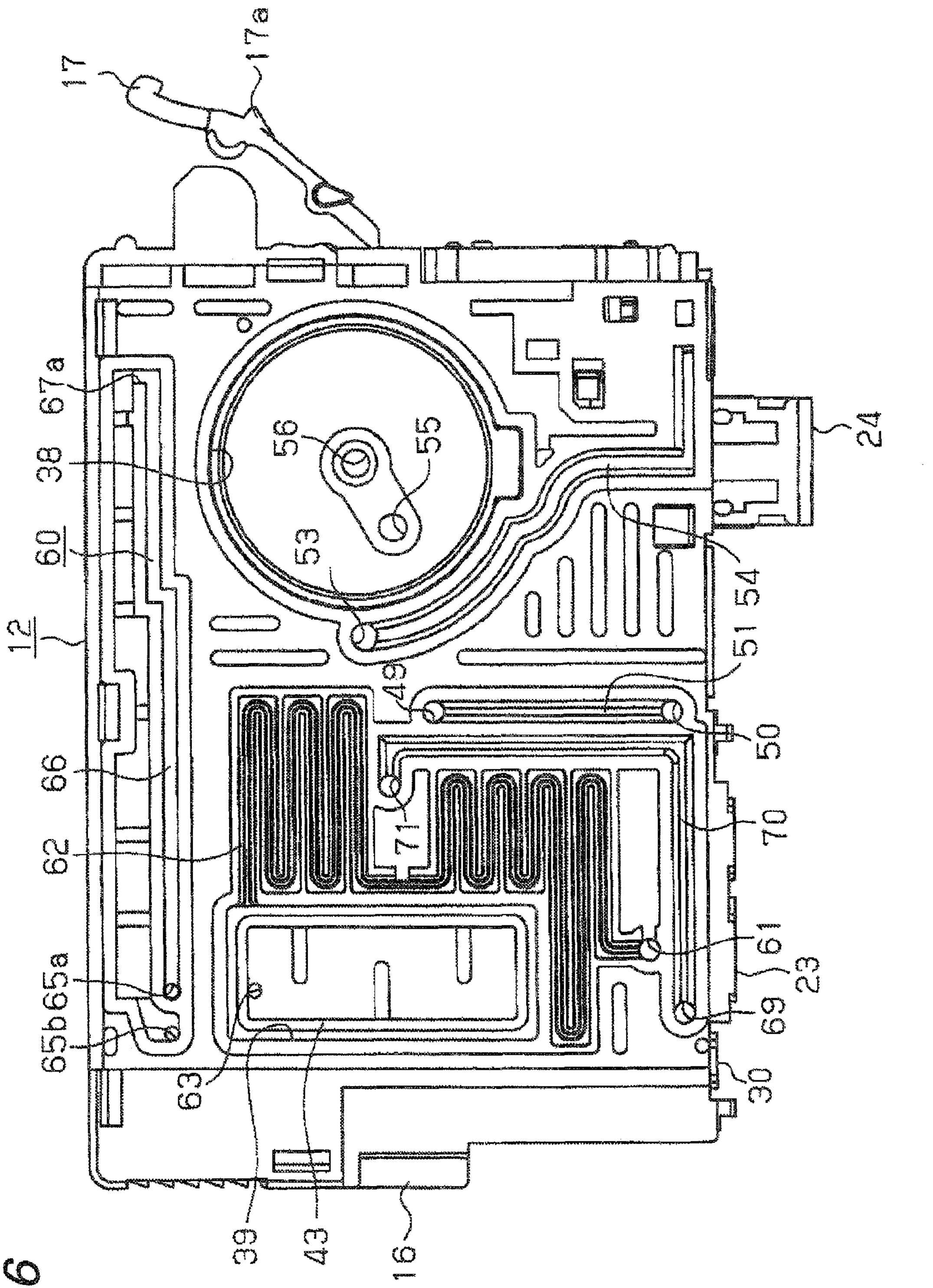
FIG. 6 is a rear (back) view illustrating the ink cartridge according to the same exemplary embodiment.

As shown in FIGS. 3 and 5, in the inside of an opening 12*a* of the container body 12, the plurality of chambers such as the ink containing chamber (liquid containing chamber) 36 and so on and flow passages are partitioned by a plurality of ribs (partition walls) 35 provide upright from the bottom surface of the opening 12*a* in a thickness wise direction of the container body 12. Meanwhile, as shown in FIGS. 4 and 6, a concavely circular differential pressure valve accommodating chamber 38 that accommodates a differential pressure valve 37 and a concavely rectangular gas-liquid separating chamber 39 are formed in the back surface (rear surface) of the container body 12.

In the inside of the differential pressure valve accommodating chamber 38, a substantial disk-shaped membrane valve (valve body) 40 that is elastically deformable, a valve cover 41 that covers the port of the differential pressure valve accommodating chamber 38, a coil spring 42 that is disposed between the valve cover 41 and the membrane valve 40 are stored. Since the differential valve accommodating chamber 38 is positioned between the ink containing chamber 36 and the ink supply port 24, the differential pressure valve 37 is interposed in the way of the ink flow passage that communicates with the ink containing chamber 36 and the ink supply port 24 each other.

In the bottom surface of the gas-liquid separating chamber 39, a rectangular ring-shaped protrusion portion 43 is formed along the inner surface thereof and a rectangular gas-liquid separating film 44 fitted into the top portion of the protrusion portion 43 is attached. The gas-liquid separating film 44 that is made of a material capable of passing gas, but blocking liquid has a function of separating gas (air) from liquid (ink). That is, the gas-liquid separating film 44 is interposed in the way of an air communicating passage 60 (see FIG. 6) that communicates with the air introducing hole 23 and the ink containing chamber 36 each other so that the ink in the ink containing chamber 36 does not drain from the air introducing hole 23 to the container body 12 and so on via the air communicating passage 60.

Next, a configuration of the ink flow passage from the ink containing chamber 36 to the ink supply port 24 will be described with reference to FIGS. 5 and 6.

As shown in FIG. 5, in the front surface of the container body 12, the ink containing chamber 36 divided into an upper ink containing chamber 45 and a lower ink containing chamber 46 by the ribs 35 is defined. Further, a substantially rectangular containing chamber flow passage 47 that serves as a buffer chamber is partitioned to be positioned between the upper ink containing chamber 45 and the lower ink containing chamber 46. A lengthwise long supply port flow passage 48 is partitioned to be positioned between the containing chamber flow passage 47 and the lower ink containing chamber 46.

In the lowest position of the upper ink containing chamber 45, a through-hole 49 is formed in the thickness wise direction (front and rear direction) of the container body 12. A through-hole 50 is formed below the through-hole 49 and in the lowest position of the lower ink containing chamber 46. As shown in FIG. 6, a communicating flow passage 51 formed in the rear surface of the container body 12 allows the through holes 49 and 50 to communicate with each other. The ink flows from the upper ink containing chamber 45 to the lower ink containing chamber 46 through the communicating flow passage 51.

As shown in FIG. 5, in the front surface of the container body 12, a communicating flow passage 52 that communicates with the lower ink containing chamber 46 through a through-hole not shown is provided in the side of the lower ink containing chamber 46. In addition, the communicating flow passage 52 communicates with the inside of the above-described sensor accommodating chamber 18 through a through-hole not shown. The communicating flow passage 52 has a three-dimensional labyrinthine structure which catches bubbles and the like in the ink so that the bubbles and so on does not flow downstream along with the ink.

As shown in FIG. 5, in the front surface of the container body 12, a through-hole 53 is formed in the containing chamber flow passage 47. Meanwhile, as shown in FIG. 6, in the rear surface of the container body 12, a communicating flow passage 54 (see FIG. 6) that extends from the sensor accommodating chamber 18 to the above-described through-hole 53 of the containing chamber flow passage 47 is formed. Further, in the containing chamber flow passage 47, a through-hole 55 is formed below the through-hole 53. The through-hole 55 communicates with a valve hole 56, which is formed above the inside of the supply port flow passage 48 and at the center of differential pressure valve accommodating chamber 38, through the differential pressure valve accommodating chamber 38.

As shown in FIG. 5, a through-hole 57 is formed below the inside of the supply port flow passage 48 and the supply port flow passage 48 communicates with the ink supply port 24 through the through-hole 57. As described above, in this exemplary embodiment, the ink flow passage (liquid flow passage) from the ink containing chamber 36 (lower ink containing chamber 46) to the ink supply port 24 includes the communicating flow passage 52, the communicating flow passage 54, the containing chamber flow passage 47, and the supply port flow passage 48 described above. Further, these ink flow passages, the ink containing chamber 36, and so on are each formed as a part of wall surfaces of the above-described front film 13 and the rear film 15 attached to the front surface and the rear surface of the container body 12.

Next, a passage structure of the air communicating passage 60 from the gas introducing hole 23 to the ink containing chamber 36 will be described with reference to FIGS. 5 and 6.

As shown in FIG. 6, in the rear surface of the container body 12, a through-hole 61 is formed to communicate with the gas introducing hole 23 in the vicinity of the gas introducing hole 23. Meandering-shaped narrow grooves 62 that communicate with the above-described gas-liquid separating chamber 39 are formed upward from the through-hole 61 and a through-hole 63 is formed in the bottom surface inside the gas-liquid separating chamber 39. The through-hole 63 communicates with the lower portion of a communicating passage 64 partitioned in the front surface of the container body 12 and a through-hole 65*a* is formed above the communicating passage 64. A through-hole 65*b* is formed immediately beside the through-hole 65*a*. In the rear surface of the container body 12, a communicating passage 66 including a returning portion 66*a* allows both of the through-holes 65*a* and 65*b* to communicate with each other.

As shown in FIG. 5, in the right corner of the front surface of the container body 12, a rectangular ink trap chamber 67 is partitioned to communicate with the above-described through-hole 65*b*. An L-shaped communicating buffer chamber 60 is formed below the ink trap chamber 67. Both of the chambers 67 and 68 communicate with each other through a notch 67*a*. A through-hole 69 is formed in the lower portion of the communicating buffer chamber 68. The through-hole 69 communicates with a through-hole 71 opened to the upper ink containing chamber 45 through a communicating passage 70 formed so as to have an L-shape in the rear surface of the container body 12. Further, in this exemplary embodiment, the narrow grooves 62, the gas-liquid separating chamber 39, the communicating passages 64 and 66, the ink trap chamber 67, the communicating buffer chamber 68, and the communicating passage 70 constitute the air communicating passage 60 formed from the air introducing hole 23 to the ink containing chamber 36 (upper ink containing chamber 45).

Next, a function of the differential pressure valve 37 will be described with reference to FIGS. 7(*a*) and 7(*b*).

Figure 7:
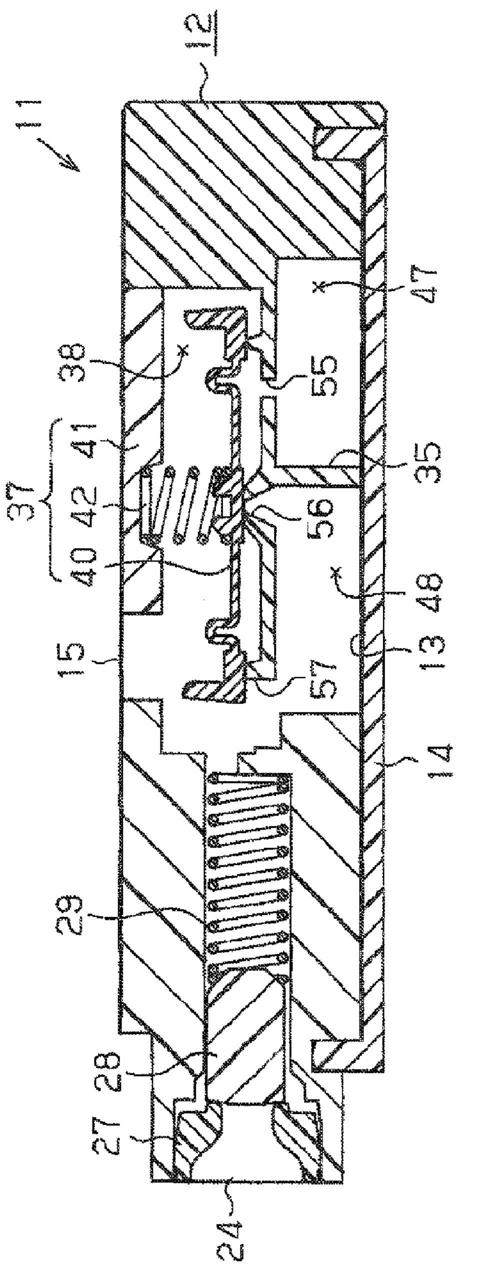
FIGS. 7(*a*) and 7(*b*) are schematic sectional views illustrating the ink cartridge according to the same exemplary embodiment, in which FIG. 7(*a*) is an explanatory view of a differential pressure valve in the closed state and FIG. 7(*b*) is an explanatory view of the differential pressure valve in the opened state.
Figure 7:
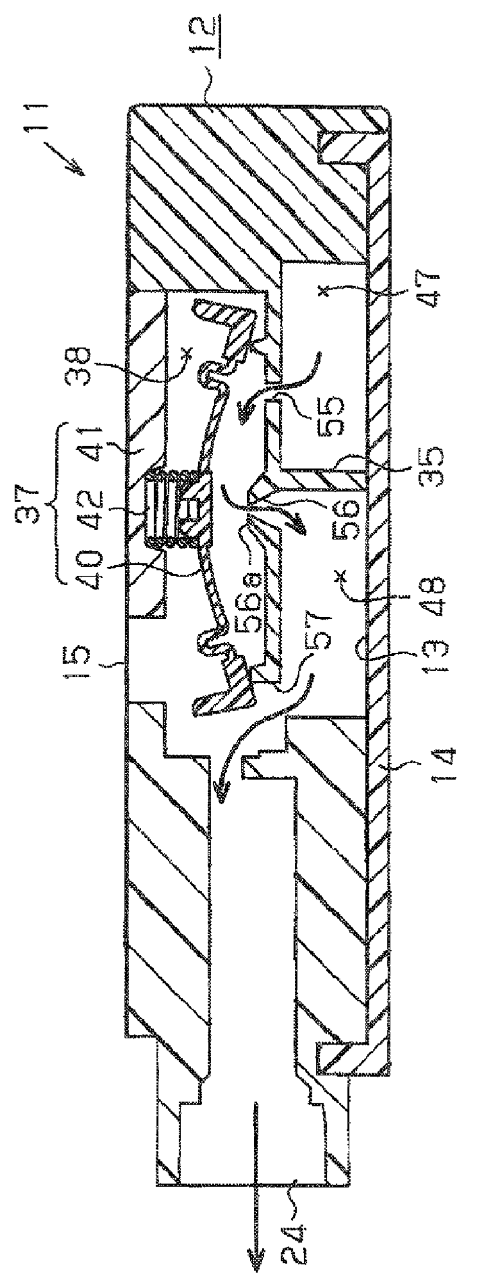

As shown in FIG. 7(*a*), the differential pressure valve 37 is urged to the closed state in the way that the membrane valve 40 normally closes the valve hole 56 by an urging force of the coil spring 42, and thus the ink that flows from the ink containing chamber 36 to the ink supply port 24 is blocked. Alternatively, a pressure of a side of the ink supply port 24, that is a pressure inside the differential pressure valve accommodating chamber 38 (back pressure of the membrane valve 40) is lowered according to the ink supply from the ink supply port 24 to the printer. Since the ink containing chamber 36 always communicates with air, a differential pressure between the side of ink supply port 24 and the side of the ink containing chamber 36 of the differential pressure valve 37 is caused by the ink supply from the ink supply port 24 to the printer. Accordingly, as shown in FIG. 7(*b*), when the differential pressure between the side of ink supply port 24 and the side of the ink containing chamber 36 of the differential pressure valve 37 is equal to or more than a predetermined value, the membrane valve 40 is elastically deformed against the urging force of the coil spring 42 and separated from a valve seat 56*a* surrounding the valve hole 56. Then, the differential pressure valve 37 allows the ink to flow from the ink containing chamber 36 to the ink supply chamber 24. Further, in FIG. 7(*b*), an arrow that denotes the ink flow is indicated and the sealing member 27, the supply valve 28, and the coil spring 29 in the inside of the ink supply port 24 are not shown.

Next, a method of manufacturing the ink cartridge 11 according to this exemplary embodiment, particularly the method of manufacturing the ink cartridge 11 by injecting the ink into the ink containing chamber 36 from the outside of the container body 12 will be described below.

In the ink cartridge 11 according to this exemplary embodiment, an ink injecting hole only for injecting the ink is not provided. For this reason, when the ink is injected into the ink containing chamber 36 initially and even when the ink is re-injected to refill ink in spite of the fact that the residual ink in the ink containing chamber 36 decreases to the extent that the liquid supply is poor, the ink supply port 24 originally used for supplying ink to the printer is also used for injecting the ink.

Figure 8:
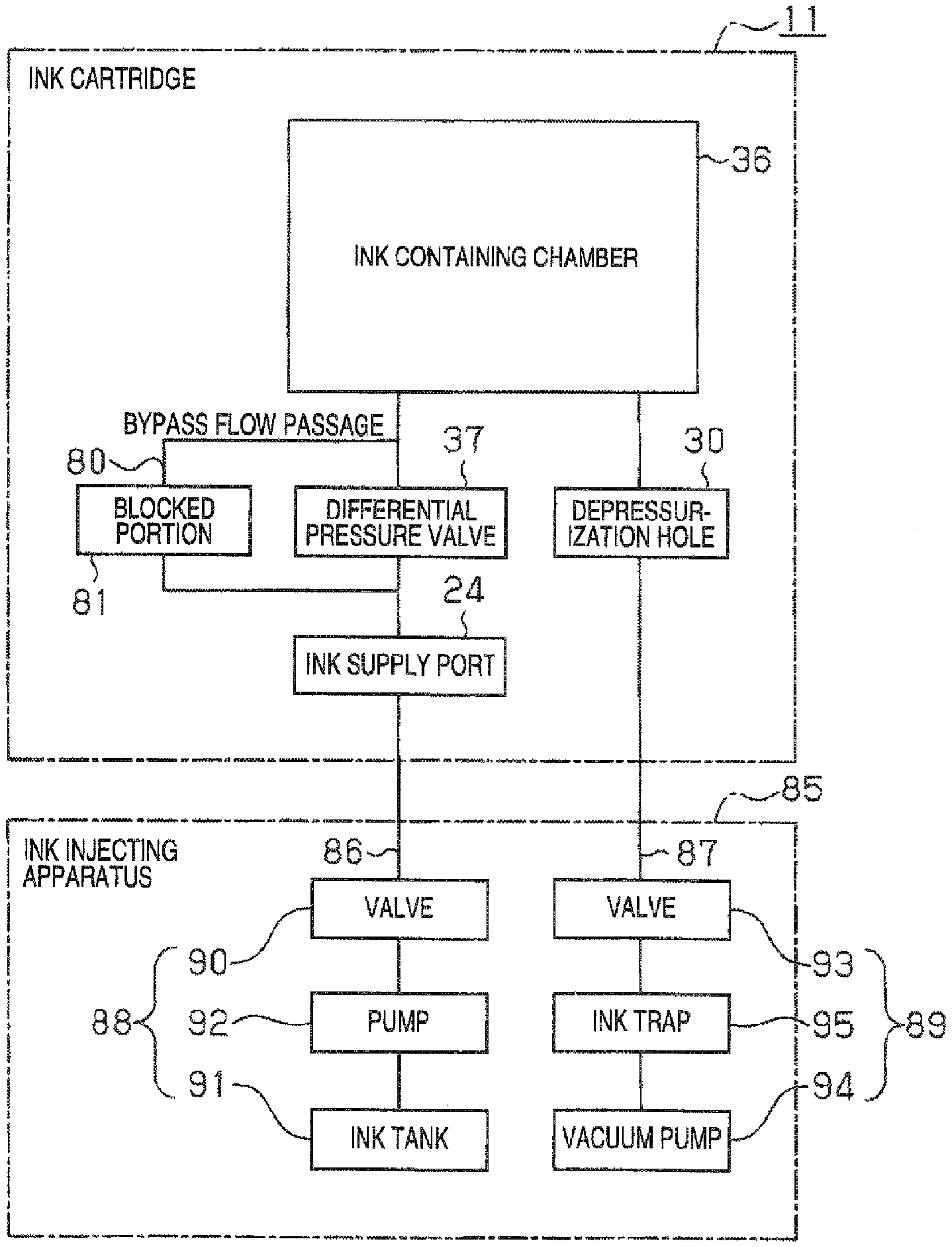
FIG. 8 is a block diagram illustrating an ink injecting process.

However, when the ink is injected into the ink containing chamber 36 of the ink cartridge 11, as shown in FIG. 8, an ink injecting apparatus 85 is used. The ink injecting apparatus 85 includes an ink injecting tube 86 that is connected airtight to the ink supply port 24 of the ink cartridge 11 and a vacuum suction tube 87 that is connected airtight to the depressurization hole 30 of the ink cartridge 11. Further, an ink injecting mechanism 88 is provided in the ink injecting tube 86. A vacuum suction mechanism 89 is provided in the vacuum suction tube 87.

The ink injecting mechanism 88 includes a valve 90 for opening/closing the ink injecting tube 86, a large-scale ink tank 91 for retaining ink, and a pump 92 for sending the ink tank 91 to the ink injecting tube 86. The ink injecting mechanism 88 allows and blocks the ink to be injected by the opening/closing operation of the valve 90. Meanwhile, the vacuum suction mechanism 89 includes a valve 93 for opening/closing the vacuum suction tube 87, a vacuum pump 94 for performing vacuum sucking through the vacuum suction tube 87, and an ink trap 95, which is disposed between valve 93 and the vacuum pump 94, for trapping the ink that flows into the vacuum suction tube 87.

However, even when the ink is sent into the ink supply port 24 by using the ink injecting apparatus 85, the differential pressure valve 37 urged to the closed state is interposed between the ink supply port 24 and the ink containing chamber 36, and thus the ink flow is blocked. Accordingly, in this exemplary embodiment, the following process is performed before the ink injecting process (liquid injecting process)

First, when the ink is initially injected and when the front film 13 is attached to the front surface (one surface) of the container body 12, gaps are formed between the top surface of the rib 35 surrounding the supply port flow passage 48 and the front film 13. That is, as shown in FIG. 5, a plurality of protrusions 35*a* are formed at a predetermined interval on the top surface of the rib 35 surrounding the supply port flow passage 48 so that the top surface between the respective protrusions 35*a* does not come in contact with the front film 13. Accordingly, the gaps through which the ink can flow are formed in spaces between the front film 13 and the top surface that is between the respective protrusions 35*a* on the rib 35.

As a result, a bypass flow passage 80 that allows the ink to bypass the differential pressure valve 37 by flowing over the rib 35 from the supply port flow passage 48 via the gaps can be formed so as to flow the ink to the containing chamber flow passage 47. Further, after the bypass forming process of forming the bypass flow passage 80 ends, the ink injecting apparatus 85 is connected to the ink cartridge 11.

That is, the ink injecting tube 86 of the ink injecting apparatus 85 is connected to the ink supply port 24 and the vacuum suction tube 87 of the ink injecting apparatus 85 is connected to the depressurization hole 30. When the connecting operations are performed, the sealing member 27, the supply valve 28, and the coil spring 29 are preferably removed from the inside of the ink supply port 24. In this case, it is necessary for the air introducing hole 23 to be sealed by the sealing film 25.

Next, the vacuum pump 94 is driven to perform depressurization process while the valve 90 of the ink injecting mechanism 88 is in the closed state and the valve 93 of the vacuum suction mechanism 89 is in the opened state. Then, the inner pressure of the ink containing chamber 36 is depressurized up to a predetermined pressure. When the depressurization process ends, the ink injecting process is performed by using the ink injecting apparatus 85.

In this case, a pump 92 of the ink injecting mechanism 88 is driven while the valve 93 of the vacuum suction mechanism 89 is in the closed state and the valve 90 of the ink injecting mechanism 88 is in the opened state. Then, the ink sent from the ink tank 91 to the ink injecting tube 86 flows into the ink supply port 24, and then is injected into the ink containing chamber 36 through the supply port flow passage 48, the bypass flow passage 80, and the containing chamber flow passage 47.

Next, when the ink injecting process (initial injecting process) ends, the ink supply port is sealed by the sealing film 34 and a bypass block process of blocking the bypass flow passage 80 is finally performed. That is, each protrusion 35*a* on the rib 35 surrounding the supply port flow passage 48 is pressure-heated from the upper portion of the front film 13 by using a jig such as heating iron. Then, the protrusions 35*a* on the rib 35 surrounding the supply port flow passage 48 are melted, and therefore the front film 13 is heat-welded into the top surface of the rib 35. Further, the bypass flow passage 80 is blocked, and thus a blocked portion 81 (see FIG. 8) is formed. Accordingly, when the initial ink injecting process ends, the process of manufacturing the ink cartridge 11 by injecting the ink into the ink containing chamber 36 ends.

Meanwhile, when the ink cartridge 11 mounted on the printer is used, and afterward the residual ink in the ink containing chamber 36 decreases to the very small amount or zero, the ink re-injecting process is performed to reuse the ink cartridge 11 in the following way. That is, when ink is re-injected, a pressing process for pressing a valve body of the differential pressure valve 37 in a direction in which the differential pressure valve is opened is performed before the ink injecting process.

Figure 9:
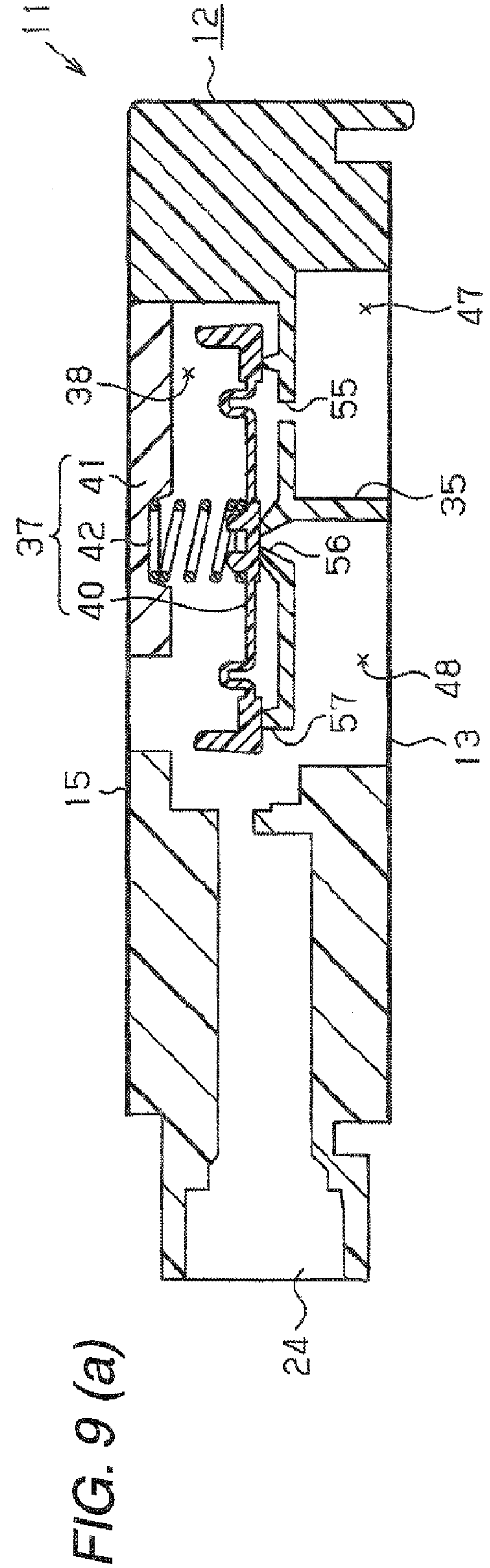
FIGS. 9(*a*) and 9(*b*) are schematic sectional views illustrating the ink cartridge and each of FIGS. 9(*a*) and 9(*b*) is an explanatory view of sequences of a pressing process.
Figure 9:
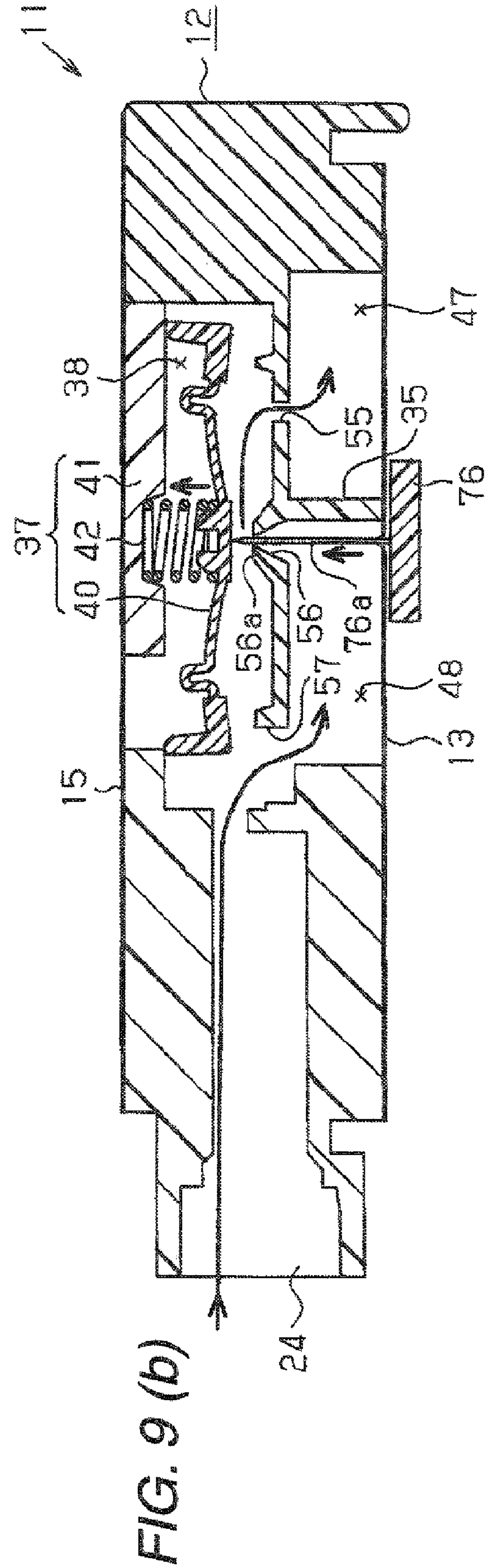

First, as shown in FIG. 9(*a*), the sealing member 27, the supply valve 28, and the coil spring 29 that constitute the valve mechanism V are removed from the ink supply port 24 (valve mechanism removing process), and then the cover 14 is detached from the front surface of the container body 12 to expose the front film 13 (cover member detaching process). Subsequently, as shown in FIG. 9(*b*), the needle-like portion 76*a* of the jig 76 is inserted into the inside of the container body 12 (specifically, into the inside of the supply port flow passage 48) using the jig 76 having a needle-like portion 76*a* such as a thumbtack so as to penetrate the front film 13 in a position corresponding to the valve hole 56. If it is necessary to remove at least a part of the sealing film 34 so as to remove the at least a part of the valve mechanism V, a sealing film removing process of removing at least a part of the sealing film 34 thermally welded to the ink supply port is performed prior to the valve mechanism removing process.

Accordingly, the needle-like portion 76*a* of the jig 76 passes through the valve hole 56 to come in contact with the membrane valve 40 in the inside of the differential pressure valve accommodating chamber 38, and presses the membrane valve 40 by the leading end thereof against an urging force of the coil spring 42 so as to be changed to the opened state. Then, the membrane valve 40 that receives the press force is moved upward and separated from the valve seat 56*a* against the urging force of the coil spring 42 so that the valve seat 56*a* is changed to the opened state. While the valve seat 56*a* is maintained to be in the opened state, the ink injecting process is performed in the same way as the initial ink injecting process by using the above-described ink injecting apparatus 85.

In this case, the depressurization process is also performed in the same way as the initial injecting process before the ink injecting process, of course. Further, it is necessary for the air introducing hole 23 to be sealed by the sealing film 25 or another sealing means.

Next, when the depressurization process ends, and then the ink injecting process starts, the ink sent from the ink tank 91 of the ink injecting apparatus 85 to the ink injecting tube 86 flows into the ink supply port 24. The ink passes from the supply port flow passage 48 to the valve hole 56 and the though-hole 55 so as to flow into the containing chamber flow passage 47. Afterward, the ink is injected into the ink containing chamber 36. When the ink injecting process (re-injecting process) ends, the jig 76 is taken out from the ink cartridge 11 (jig taking-out process) and a through hole of the front film 13 formed by the jig 76 is sealed by a sealing member (first sealing process) Then, the sealing member 27, the supply valve 28, and the coil spring 29 in the ink supply port 24 return to the original position. Further, the ink supply port is sealed with another sealing film (second sealing process) and thereby the process of manufacturing the ink cartridge 11 ends.

When the ink is re-injected, particularly in the forcible valve opening process, the needle-like portion 76*a* of the jig 76 comes in contact with the membrane valve 40. Accordingly, the membrane valve 40 can scar a little, but there is rarely a case where the valve malfunctions. In addition, in the forcible valve opening process, the pierced needle hole scar remains in the front film 13 through which the needle-like portion 76*a* of the jig 76 pierces. However, there is no trouble as long as the small pierced needle hole scar is covered by a film or tape.

Accordingly, the following effects will be achieved according to this exemplary embodiment.

(1) When the ink is injected into the ink containing chamber 36, the ink supply port 24 originally used for supplying ink to the printer can be also used for injecting the ink without depending on the ink injecting-only hole. Therefore, a simplification of the ink cartridge 11, for example, by omitting the ink injecting-only hole, can contribute to a decrease in a product cost.

(2) When the residual ink in the ink containing chamber 36 decreases to a very small amount or zero and when ink is re-injected from the ink supply port 24, the ink cartridge 11 is reusable. Accordingly, it is unnecessary for the used ink cartridge to be recovered/disposed.

(3) When the ink cartridge 11 is manufactured by initially injecting or re-injecting the ink into the ink containing chamber 36, the ink is injected by using the ink supply port 24. In this case, the troublesome manual work such as removing a sealing film or re-attachment is not required as compared with the case where the ink-injecting-only hole is used. As a result, the ink can be easily and effectively injected into the ink containing chamber 36.

(4) When the residual ink in the ink cartridge 11 decreases to the extent that the ink supply is poor, the ink cartridge 11 is reusable by injecting ink from the ink supply port 24. As a result, unnecessary dispose can be suppressed, and thus an effective use of resources is possible.

(5) The differential pressure valve 37 that is normally urged to the closed state can be forcibly changed to the opened state just by allowing the jig 76 to penetrate the front film 13 and to be inserted into the container body 12 to press the differential pressure valve 37. Moreover, after the ink is injected, the differential pressure valve 37 can be urged to the original closed state again Dust by taking out the jig 76 to the outside of the container body 12. Accordingly, the large-scale equipment for allowing the differential pressure valve 37 to be changed to the opened state is not required. As a result, an increase in a manufacturing cost can be suppressed. Meanwhile, in the pressing process, it is not necessary to use the jig 78 as long as the differential pressure valve 37 is opened by pressing the valve body of the differential pressure valve 37.

(6) Since the needle-like portion 76*a* of the jig 76 penetrates the front film 13 at a position corresponding to the valve hole 56, the needle-like portion 76*a* can pass through the valve hole 56 and press the center of the membrane valve 40. As a result, the differential pressure valve 37 is forcibly changed to the opened state easily and effectively.

(7) Since the inside of the ink containing chamber 36 is depressurized in the depressurization process before the ink injecting process, the ink can be effectively injected into the ink containing chamber 36 in the subsequent ink injecting process.

(8) Although in the exemplary embodiment of the invention, the pressing process is exemplified as a valve opening process for opening the differential pressure valve 37, any other valve opening processes can be applied as long as the ink can be injected from the liquid supply port 37.

(Second Exemplary Embodiment)

Next, a second exemplary embodiment of the invention will be described in detail with reference to the FIGS. 10 to 13. An ink cartridge (liquid container) 111 according to the this exemplary embodiment has the same fundamental configuration as the ink cartridge 11 according to the first exemplary embodiment and a part of an accompanying configuration is different from that according to the first exemplary embodiment. The same or common fundamental configuration elements as those of the ink cartridge 11 according to the first exemplary embodiment are denoted by the reference numerals of three digits of which the last two digits are the reference numerals (two digits) for the configuration elements of the ink cartridge 11 according to the first exemplary embodiment, and the repetition description thereof will be omitted.

Figure 10:
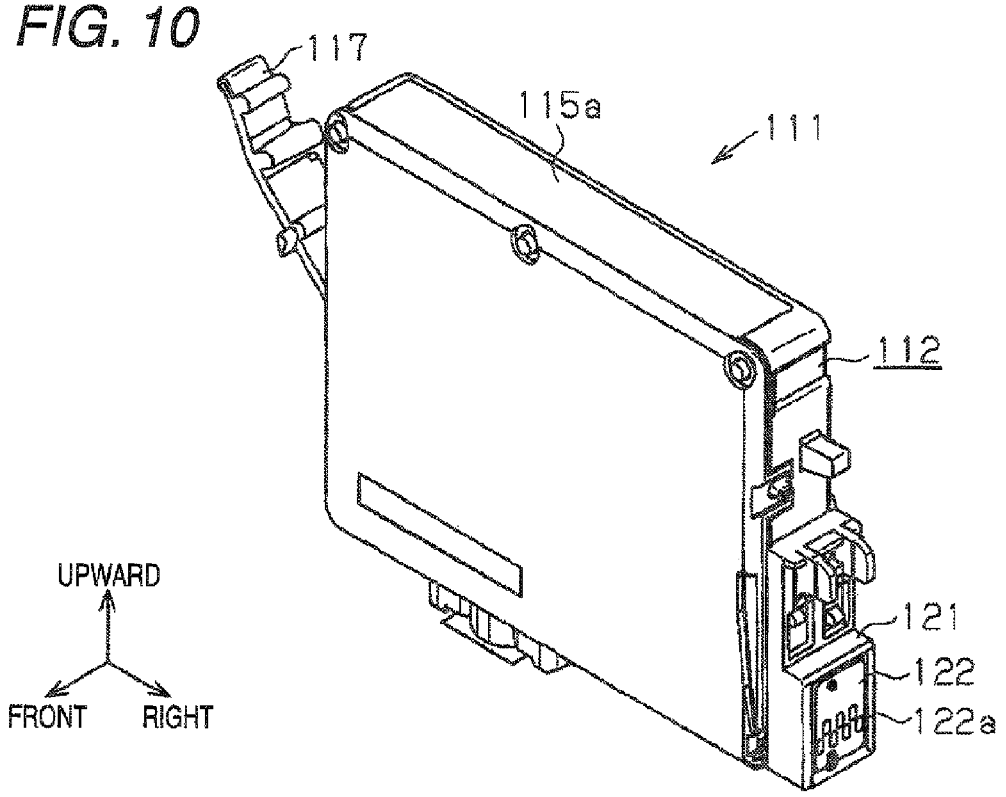
FIG. 10 is a perspective view illustrating the front surface of an ink cartridge according to a second exemplary embodiment.
Figure 11:
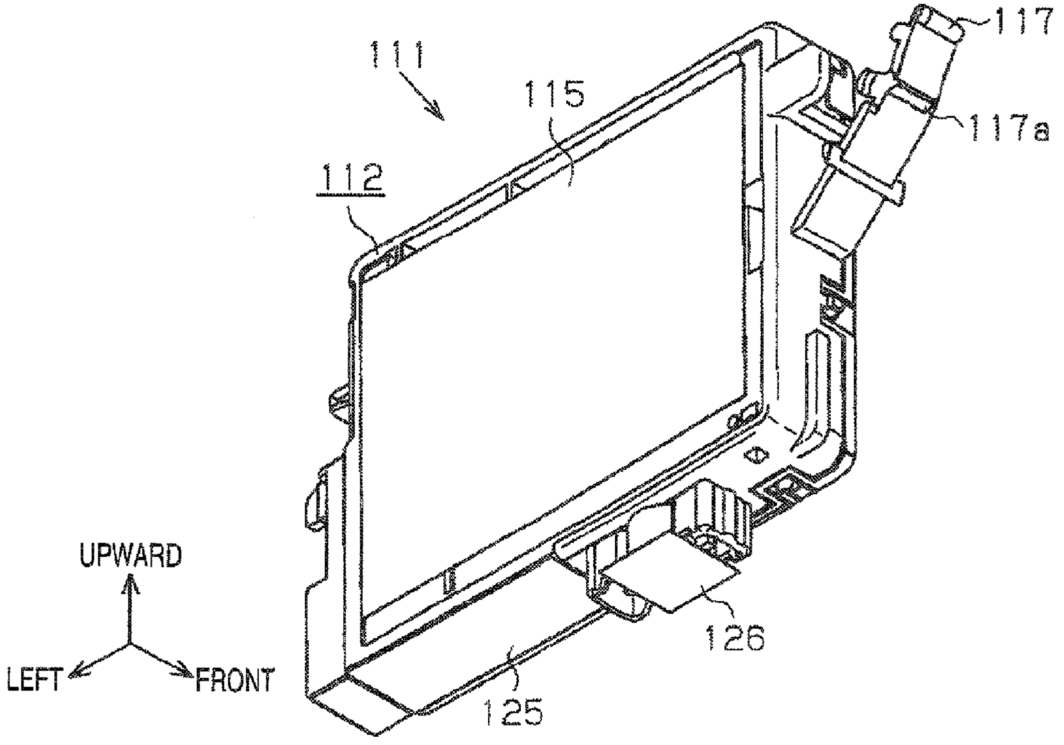
FIG. 11 is a perspective view illustrating the rear surface of the ink cartridge according to the same exemplary embodiment.
Figure 12:
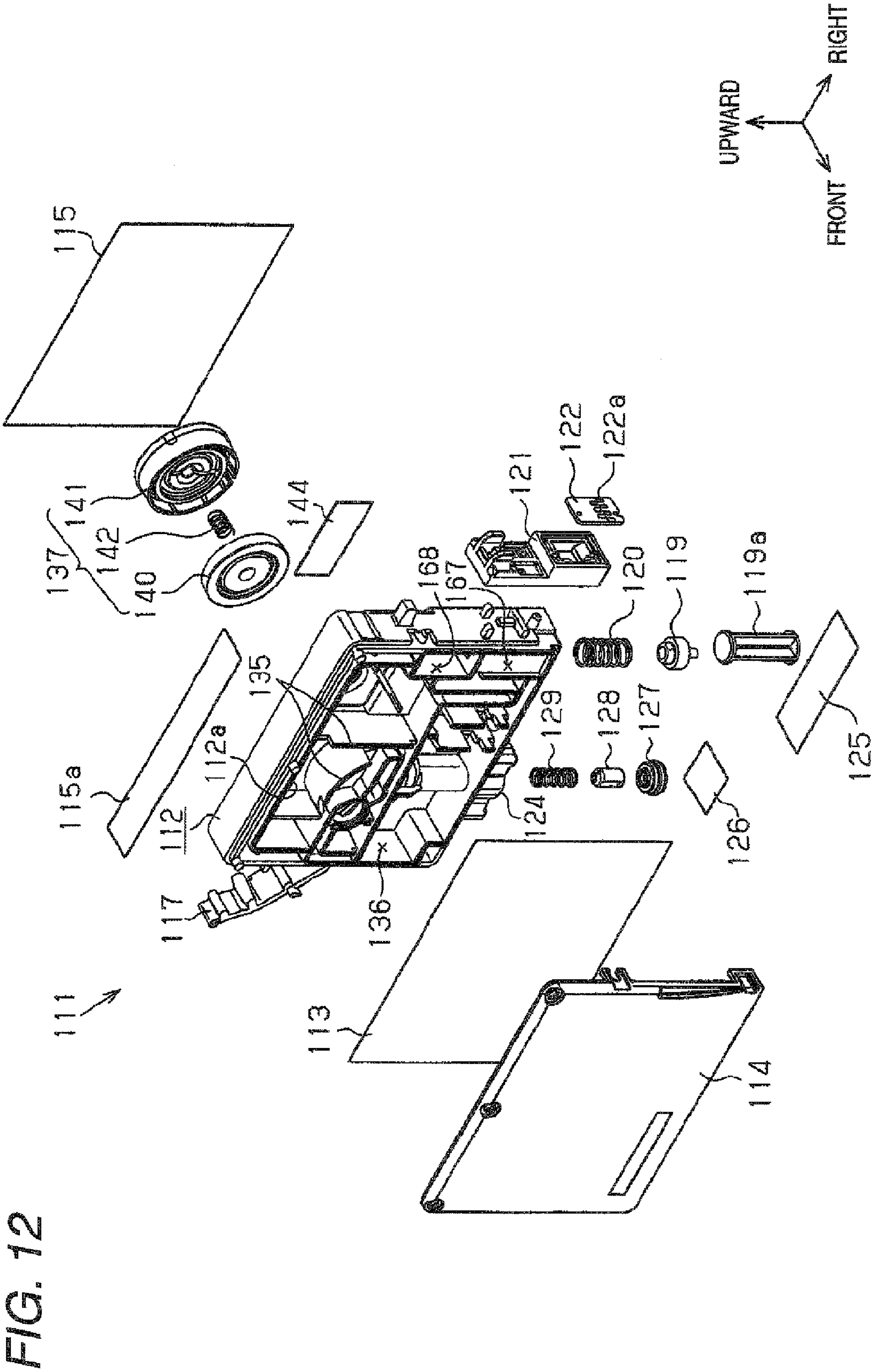
FIG. 12 is an exploded perspective view illustrating the front surface of the ink cartridge according to the same exemplary embodiment.
Figure 13:
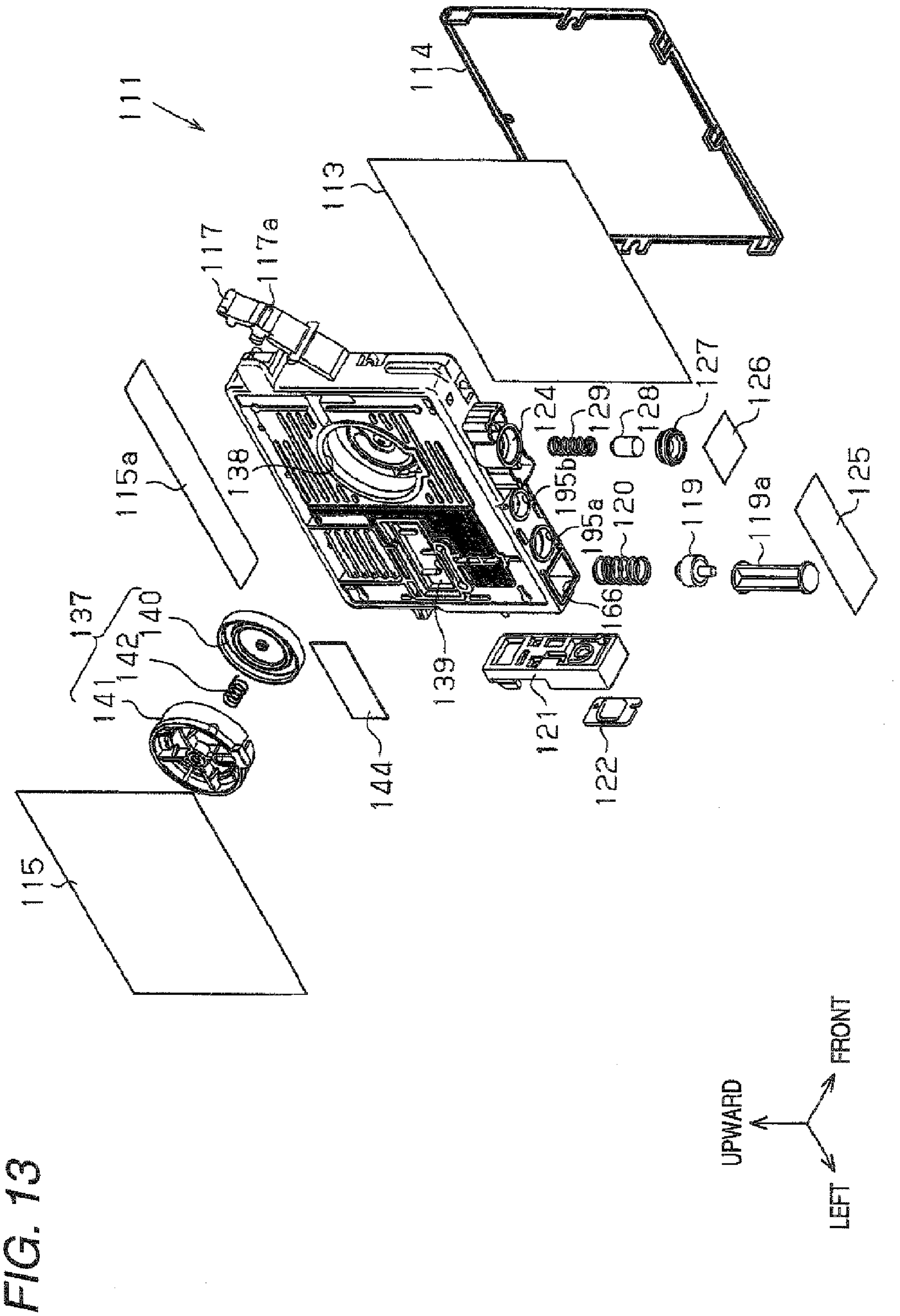
FIG. 13 is an exploded perspective view illustrating the rear surface of the ink cartridge according to the same exemplary embodiment.

The accompanying configuration different from the ink cartridge 11 according to the first exemplary embodiment will be described. As shown in FIGS. 10, 12, and 13, a rear film 115 is attached to only cover the rear surface of a container body 112, but is not attached so as to cover the upper surface of the container body 112. Further, a belt-shaped identifying label 115*a* that, for example, represents a kind of an ink color of an ink cartridge 111 is attached to the upper surface of the container body 112, instead.

As shown in FIG. 13, in the lower surface of the container body 112, a first ink injecting hole 195*a* that communicates with a lower ink containing chamber (not shown) and a second ink injecting hole 195*b* that communicate with an upper ink containing chamber (not shown) are opened. That is, when ink is initially injected into the ink containing chamber, any one of both the ink injecting holes 195*a* and 195*b* in the ink cartridge 111 can be used. Further, in the ink cartridge 111, an air introducing hole is formed so that the front end of a narrow groove which has a meandering shape in the rear surface of the container body 112 is holed through the rear film 115 in a position corresponding to the front end.

Similarly, in the lower surface of the container body 112, a port 166 is formed in a left side of the first ink injecting hole 195*a*. As shown in FIG. 12, a communicating chamber 167 that constitutes a part of the air communicating passage is formed in the inside of the port 166. A substantially cylindrical pressure member 119*a* is accommodated in the inside of the communicating chamber 167. Similarly, a communicating chamber 168 that constitutes a part of the air communicating passage is formed above the communicating chamber 167 with a wall interposed therebetween. In the inside of the communicating 168, an air valve 119 and a coil spring 120 are accommodated from the front surface of the container body 112.

Even in the ink cartridge 111 describe above, the needle-like portion 76*a* of the jig 76 is inserted into the inside of the container body 112 so as to pierce the front film 113 after the cover 114 is removed from the container body 112 so that a differential pressure valve 137 is forcibly changed to the opened state against an urging force. As a result, the ink cartridge 111 according to the second exemplary embodiment can also have the same effects as the above-described (1) to (7) effects according to the first exemplary embodiment.

(Third Exemplary Embodiment)

Next, a third exemplary embodiment of the invention will be described in detail with reference to the FIGS. 14 to 17. An ink cartridge (liquid container) 211 according to this exemplary embodiment has the nearly same fundamental configuration as the ink cartridge 11 according to the first exemplary embodiment does. Some accompanying configurations are different from that according to the first exemplary embodiment. The same or common fundamental configuration elements as those of the ink cartridge 11 according to the first exemplary embodiment are denoted by the reference numerals of three digits of which the last two digits are the reference numerals (two digits) for the configuration elements of the ink cartridge 11 according to the first exemplary embodiment, and the repetition description thereof will be omitted.

Figure 14:
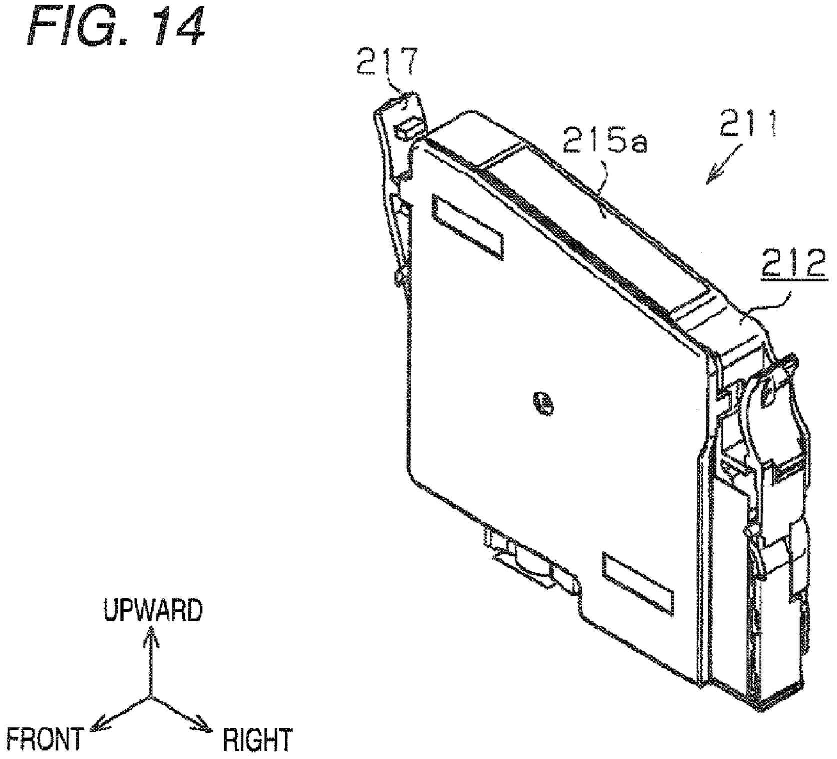
FIG. 14 is a perspective view illustrating the front surface of an ink cartridge according to a third exemplary embodiment.
Figure 15:
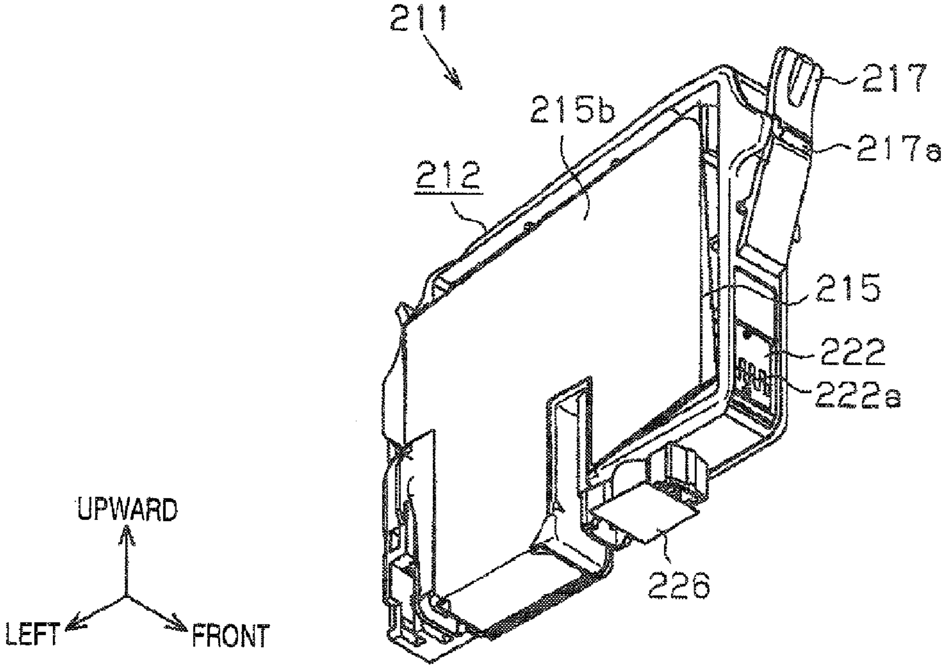
FIG. 15 is a perspective view illustrating the rear surface of the ink cartridge according to the same exemplary embodiment.
Figure 16:
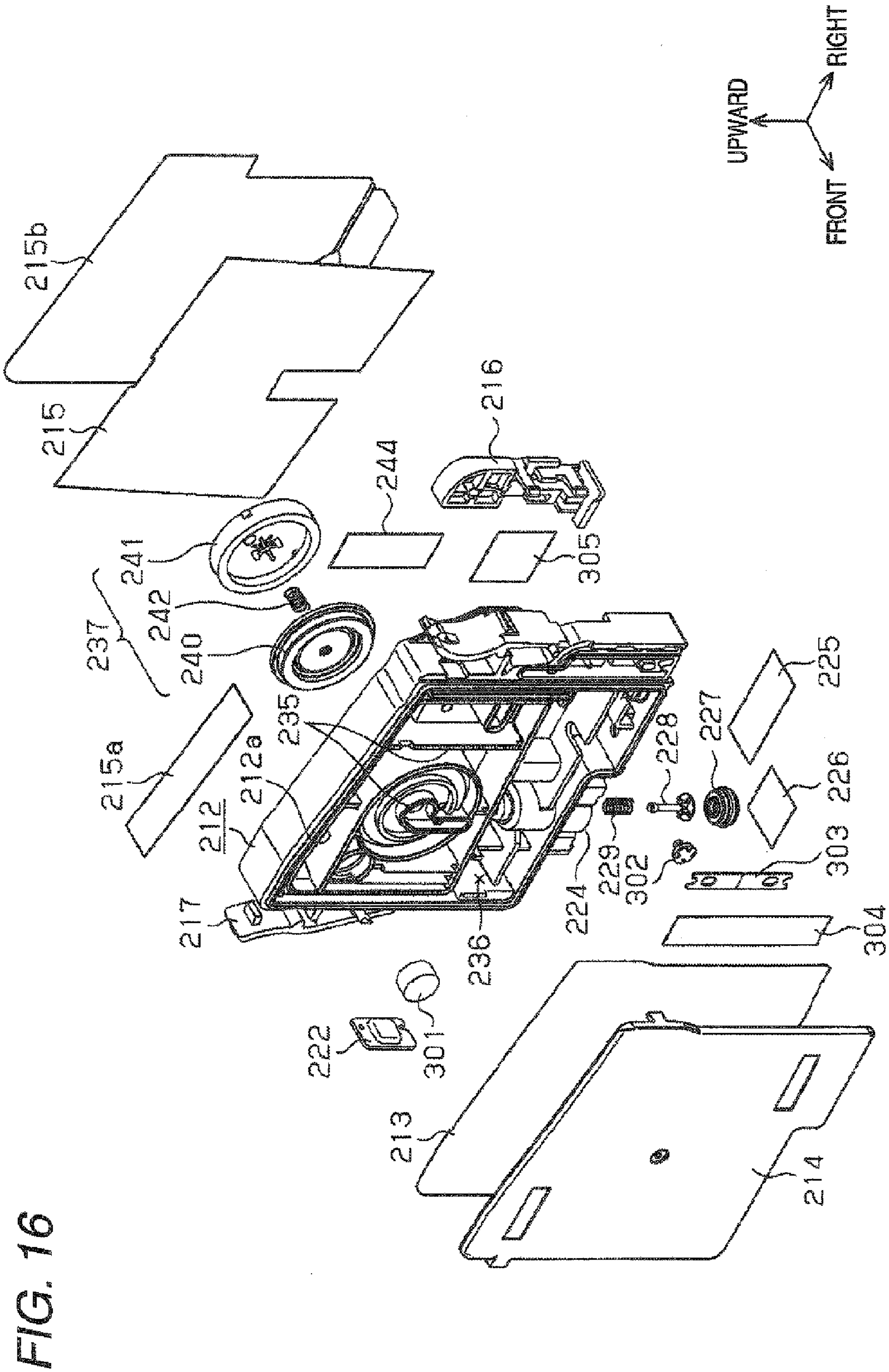
FIG. 16 is an exploded perspective view illustrating the front surface of the ink cartridge according to the same exemplary embodiment.
Figure 17:
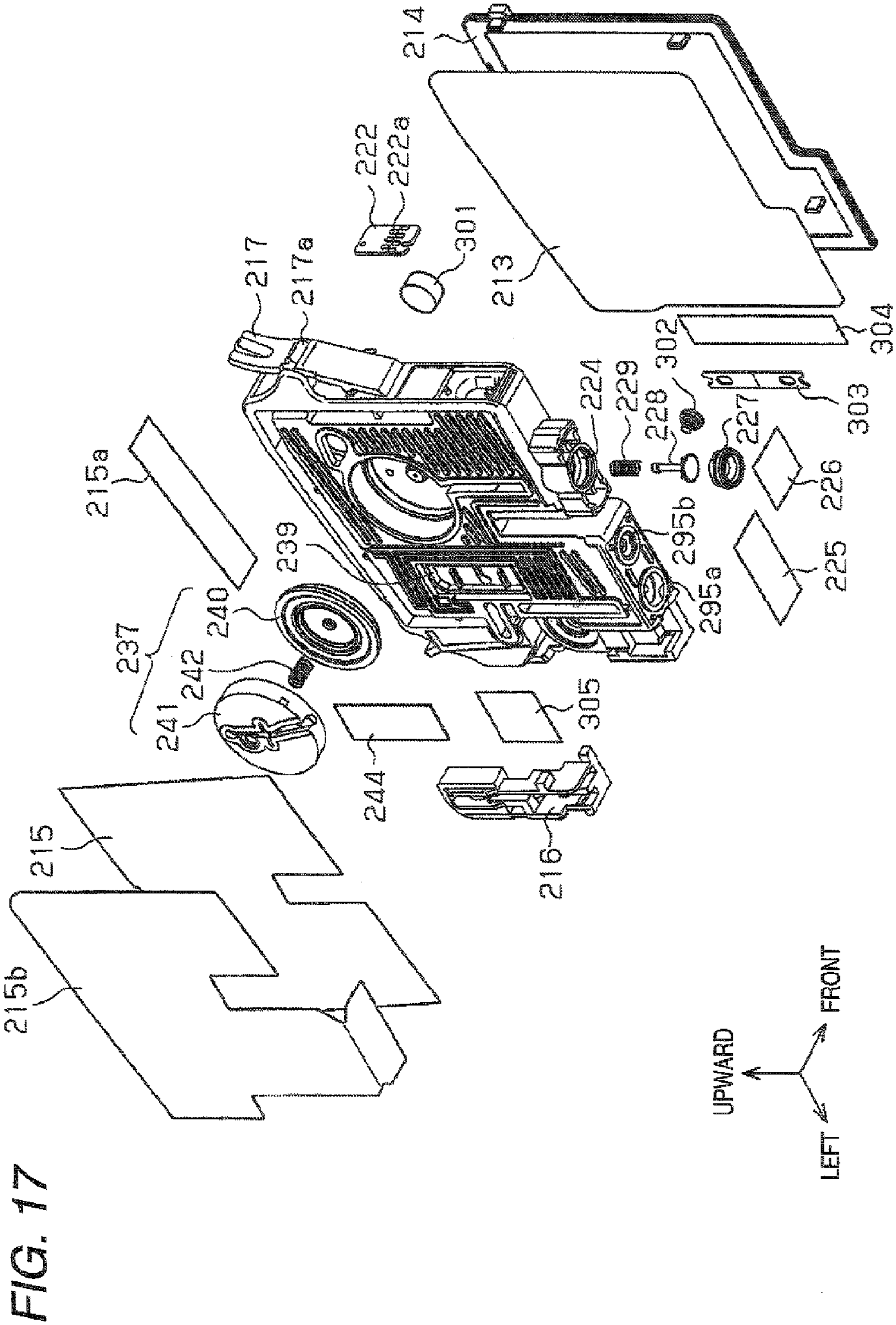
FIG. 17 is an exploded perspective view illustrating the rear surface of the ink cartridge according to the same exemplary embodiment.

The accompanying configurations different from those of the ink cartridge 11 according to the first exemplary embodiment will be described. As shown in FIGS. 14, 16, and 17, a rear film 215 is attached to cover only the rear surface of a container body 212, but is not attached so as to cover the upper surface of the container body 212. Instead, a belt-shaped identifying label 215*a* that, for example, indicates a kind of an ink color of an ink cartridge 211 is attached to the upper surface of the container body 212. Further, a decorative film 215*b* is attached to the outer side of the rear film 215 in this exemplary embodiment.

As shown in FIG. 17, in the lower surface of the container body 212, a first ink injecting hole 295*a* that communicates with a lower ink containing chamber (not shown) and a second ink injecting hole 295*b* that communicates with an upper ink containing chamber (not shown) are opened. That is, when ink is initially injected into the ink containing chamber, any one of both the ink injecting holes 295*a* and 295*b* in the ink cartridge 211 can be used. Further, in the ink cartridge 211, an air introducing hole is formed so that the front end of a narrow groove which has a meandering shape in the rear surface of the container body 212 is holed through the rear film 215 at a position corresponding to the front end thereof.

In the ink cartridge 211, as shown in FIGS. 16 and 17, a filter 301 is mounted in a portion for serving as a filter chamber in a way of the ink flow passage. Moreover, the air introducing valve 302 is accommodated along with a plate spring 303 in the valve accommodating chamber that communicates with the ink containing chamber so that the ports thereof are sealed by a film 304.

Even in the above-described ink cartridge 211 according to this exemplary embodiment, the needle-like portion 76*a* of the jig 76 is inserted into the container body 212 so as to pierce through the front film 213 after the cover 214 is removed from the container body 212 in the same manner as the ink cartridge 11 according to the first exemplary embodiment. In this way, a differential pressure valve 237 can be forcibly changed to the opened state against an urging force. As a result, the ink cartridge 211 according to the third exemplary embodiment can also have the same effects as the above-described (1) to (7) effects according to the first exemplary embodiment.

Each above-described exemplary embodiment can be modified into various forms as follows.

In the depressurization process, the vacuum suction tube 87 is connected to the air introducing hole 23, with the depressurization hole 30 sealed, and then the inside of the ink containing chamber 36 can be depressurized by sucking the air through the air communicating passage 60 without using the depressurization hole 30. According to the above-described configuration, since it is unnecessary for the depressurization hole 30 to be formed in the container body 12, a simplified configuration of the ink cartridge 11 can be achieved.

The depressurization process can be omitted as long as it is not difficult to inject the ink into the ink containing chamber 36 without the depressurization by raising the injecting pressure at the time of injecting the ink.

When the needle-like portion 76*a* of the jig 76 is inserted to allow the membrane valve 40 to be changed to the opened state, the needle-like portion 76*a* may pass through the through-holes 55 or 57 not the valve hole 56 so as to press the membrane valve 40 to be changed to the opened state.

As a method of allowing the membrane valve 40 to be changed to the opened state by using the jig 76, the needle-like portion 76*a* thereof is inserted into the differential pressure valve accommodating chamber 37 so as to penetrate the rear film 15 not the front film 13, and then, for example, the membrane valve 40 may be raised from the differential pressure valve accommodating chamber 37 so as to be changed to the opened state by the needle-like portion 76*a*. It is sufficient to form a gap, by piercing the film member with the jig 75, between the valve body 40 of the differential pressure valve 37 and the valve seat 56*a* on which the valve body 40 is seated for allowing ink to be injected from the ink supply port 24 to the ink containing chamber 36.

The injection of the ink by means of using the ink supply port 24 is not limited to the re-injection for refilling when the residual ink decreases, but may be applied to an initial injection of ink into the ink cartridge 11.

A magnetic body may be mounted in apart of the membrane valve 40 so that the membrane valve 40 is attracted by the magnetic force from the rear surface of the container body 12 in a position corresponding to the differential pressure valve accommodating chamber 38 so as to be changed to the opened state.

In the valve mechanism removing processing, it is not necessary to remove all of the sealing member 27, the supply valve 28 and the coil spring 29 from the inside of the ink supply port 24 as long as a gap between the valve body 40 of the differential pressure valve 37 and the valve seat 56*a* on which the valve body 40 is seated are formed by the jig 75.

The liquid container is not limited to the ink cartridge that is mounted on the printer to be used, but can be applied to a liquid container that is mounted on, for example, a printing apparatus that is used for a facsimile or a copier or a different liquid jetting apparatus for jetting a liquid such as an electrode material or a color material that are used for manufacturing a liquid crystal display, an EL display, a plane emission display, and so on. Moreover, the liquid container may be also applied to a liquid container that is mounted on a liquid jetting apparatus for jetting bioorganic matter used for manufacturing a biochip or a sample jetting apparatus for being used as a precision pipette.

The entire disclosure of Japanese Patent Application No. 2006-220736, filed on Aug. 11, 2006 is expressly incorporated by reference herein.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the sprit and scope of the invention.

What is claimed is:

1. A method of manufacturing a liquid container, the liquid container comprising a liquid containing chamber in which a liquid can be contained, an air communicating passage allowing the liquid containing chamber to communicate with the air, a liquid supply port for supplying the liquid contained in the liquid container to an outside, a liquid flow passage allowing the liquid container and the liquid supply port to communicate with each other, a valve accommodating chamber disposed in the liquid flow passage, a differential pressure valve which is disposed in the valve accommodating chamber, which is normally urged to a closed state, and which is changed from the closed state to an opened state when a differential pressure of a side of the liquid supply port and a side of the liquid containing chamber is equal to or more than a predetermined value, and a film member forming a part of the valve accommodating chamber, the method comprising:

moving a valve body of the differential pressure valve in a direction in which the differential pressure valve is opened; and injecting the liquid from the liquid supply port to the liquid containing chamber via the liquid flow passage while maintaining the opened state of the differential pressure valve.

2. The method according to claim 1, wherein the differential pressure valve is forcibly opened by piercing the film member with a jig from the outside to an inside of the liquid container such that the jig penetrates the film member and forming a gap between the valve body of the differential pressure valve and a valve seat on which the valve body is seated.

3. The method according to claim 2, wherein the jig has a needle portion capable of penetrating the film member and is inserted into the liquid container so that a leading end of the needle portion passes through a valve hole closed by the valve body in the closed state and presses the valve body so as to be changed to the opened state.

4. The method according to claim 2, further comprising:

taking out the jig after injecting the liquid; and sealing a through hole of the film member formed by the jig.

5. The method according to claim 1, further comprising depressurizing the inside of the liquid containing chamber before injecting the liquid.

6. The method according to claim 5, wherein the inside of the liquid containing chamber is depressurized through the air communicating passage.

7. The method according to claim 1, further comprising sealing the liquid supply port with a sealing film after injecting the liquid.

8. A method of manufacturing a liquid container, the liquid container comprising a liquid containing chamber in which a liquid can be contained, an air communicating passage allowing the liquid containing chamber to communicate with the air, a liquid supply port for supplying the liquid contained in the liquid container to an outside, a liquid flow passage allowing the liquid container and the liquid supply port to communicate with each other, a valve accommodating chamber disposed in the liquid flow passage, and a differential pressure valve which is disposed in the valve accommodating chamber, which is normally urged to a closed state, and which is changed from the closed state to an opened state when a differential pressure of a side of the liquid supply port and a side of the liquid containing chamber is equal to or more than a predetermined value, the method comprising:

opening the differential pressure valve; and injecting the liquid from the liquid supply port to the liquid containing chamber.

* * * * *